(12) United States Patent
Hughes et al.

(10) Patent No.: US 12,106,078 B2
(45) Date of Patent: Oct. 1, 2024

(54) SYSTEMS AND METHODS FOR RAPIDLY BUILDING, MANAGING, AND SHARING MACHINE LEARNING MODELS

(71) Applicant: DIGITAL REASONING SYSTEMS, INC., Franklin, TN (US)

(72) Inventors: Cory Hughes, Panama City Beach, FL (US); Timothy Estes, Nashville, TN (US); John Liu, Nashville, TN (US); Brandon Carl, Brooklyn, NY (US); Uday Kamath, Ashburn, VA (US)

(73) Assignee: Digital Reasoning Systems, Inc., Franklin, TN (US)

( * ) Notice: Subject to any disclaimer, the term of this patent is extended or adjusted under 35 U.S.C. 154(b) by 1259 days.

(21) Appl. No.: 16/613,301

(22) PCT Filed: May 14, 2018

(86) PCT No.: PCT/US2018/032607
§ 371 (c)(1),
(2) Date: Nov. 13, 2019

(87) PCT Pub. No.: WO2018/213205
PCT Pub. Date: Nov. 22, 2018

(65) Prior Publication Data
US 2020/0202171 A1    Jun. 25, 2020

Related U.S. Application Data

(60) Provisional application No. 62/505,936, filed on May 14, 2017.

(51) Int. Cl.
*G06N 20/00* (2019.01)
*G06F 8/36* (2018.01)
(Continued)

(52) U.S. Cl.
CPC .......... *G06F 8/36* (2013.01); *G06F 18/2113* (2023.01); *G06F 18/214* (2023.01);
(Continued)

(58) Field of Classification Search
CPC .......... G06N 3/045; G06N 7/01; G06N 20/00; G06N 20/20; G06N 3/08; G06F 8/36;
(Continued)

(56) References Cited

U.S. PATENT DOCUMENTS 8,250,408 B1   8/2012  Cohen et al.
8,751,421 B2   6/2014  Anderson et al.
(Continued)

FOREIGN PATENT DOCUMENTS

CN    101425152 A    5/2009
CN    106560848 A    4/2017
(Continued)

OTHER PUBLICATIONS

Bank of England, FinTech Proof of Concept, Digital Reasoning—big data text analytics, 1016, 2 pages.
(Continued)

*Primary Examiner* — Dave Misir
(74) *Attorney, Agent, or Firm* — Meunier Carlin & Curfman LLC

(57) ABSTRACT

In some aspects, systems and methods for rapidly building, managing, and sharing machine learning models are provided. Managing the lifecycle of machine learning models can include: receiving a set of unannotated data; requesting annotations of samples of the unannotated data to produce an annotated set of data; building a machine learning model based on the annotated set of data; deploying the machine learning model to a client system, wherein production annotations are generated; collecting the generated production annotations and generating a new machine learning model
(Continued)

incorporating the production annotations; and selecting one of the machine learning model built based on the annotated set of data or the new machine learning model.

54 Claims, 24 Drawing Sheets

(51) Int. Cl.
| | |
|---|---|
| *G06F 18/20* | (2023.01) |
| *G06F 18/21* | (2023.01) |
| *G06F 18/2113* | (2023.01) |
| *G06F 18/214* | (2023.01) |
| *G06N 3/08* | (2023.01) |
| *G06N 20/20* | (2019.01) |
| *G06V 10/772* | (2022.01) |
| *G06V 10/778* | (2022.01) |

(52) U.S. Cl.
CPC .......... *G06F 18/217* (2023.01); *G06F 18/285* (2023.01); *G06N 3/08* (2013.01); *G06N 20/00* (2019.01); *G06N 20/20* (2019.01); *G06V 10/772* (2022.01); *G06V 10/7788* (2022.01); *G06V 10/7796* (2022.01)

(58) Field of Classification Search
CPC .. G06F 18/217; G06F 18/285; G06F 18/2113; G06F 18/214; G06V 10/772; G06V 10/7788; G06V 10/7796
See application file for complete search history.

(56) References Cited

U.S. PATENT DOCUMENTS

| | | | |
|---|---|---|---|
| 9,058,317 B1 | 6/2015 | Gardner et al. | |
| 9,111,218 B1* | 8/2015 | Lewis | G06Q 30/01 |
| 2006/0212293 A1* | 9/2006 | Tur | G10L 15/065 |
| | | | 704/E15.009 |
| 2007/0143284 A1* | 6/2007 | Lee | G06F 40/44 |
| | | | 707/999.005 |
| 2008/0126556 A1* | 5/2008 | Perng | H04L 65/70 |
| | | | 709/231 |
| 2010/0063948 A1 | 3/2010 | Virkar et al. | |
| 2010/0257167 A1* | 10/2010 | Liu | G06F 16/35 |
| | | | 707/731 |
| 2014/0279716 A1* | 9/2014 | Cormack | G06F 16/285 |
| | | | 706/11 |
| 2014/0380286 A1* | 12/2014 | Gabel | G06F 8/20 |
| | | | 717/139 |
| 2015/0092054 A1 | 4/2015 | Saptharishi et al. | |
| 2015/0317589 A1* | 11/2015 | Anderson | G06N 20/10 |
| | | | 705/7.25 |
| 2016/0068915 A1* | 3/2016 | Kennedy | G16B 20/30 |
| | | | 435/6.12 |
| 2016/0162802 A1* | 6/2016 | Chickering | G06N 20/00 |
| | | | 706/12 |
| 2016/0358099 A1* | 12/2016 | Sturlaugson | G06N 5/043 |
| 2017/0011077 A1* | 1/2017 | Kypreos | G06Q 40/00 |
| 2017/0032279 A1 | 2/2017 | Miserendino et al. | |
| 2017/0032281 A1 | 2/2017 | Hsu | |
| 2018/0032901 A1* | 2/2018 | Chowdhury | G06F 40/169 |
| 2018/0349772 A1 | 12/2018 | Tokui et al. | |

FOREIGN PATENT DOCUMENTS

| | | | |
|---|---|---|---|
| JP | 2013538543 | A | 10/2013 |
| JP | 2016042322 | A | 3/2016 |
| WO | 2016140701 | A1 | 9/2016 |
| WO | 2017023416 | A1 | 2/2017 |
| WO | 2017073000 | A1 | 5/2017 |

OTHER PUBLICATIONS

International Preliminary Report on Patentability, issued for Application No. PCT/US2018/032607, dated Nov. 28, 2019.
Notice of Allowance issued in Singapore Application No. 11201910380S, dated Feb. 15, 2023, 5 pages.
Office Action issued in Chinese Application No. 201880046890.6, dated Mar. 1, 2023, 9 pages.
Australian Patent Application No. 2018269941, First Examination Report, issued May 5, 2022, 3 pages.
Notice of Reasons for Rejection dated May 17, 2022, issued in Japanese Patent Application No. 2019-564084, and English translation, 13 pages.
Miyazaki, Ryosuke, "Term Extraction by learning with distant supervision using Wikipedia," Proceedings of the 21st Annual Meeting of the Association for Natural Language Processing, Mar. 17, 2015, pp. 87-90, https://www.anlp.jp/proceedings/annual_meeting/2015/pdf_dir/P1-22.pdf.
Singapore Patent Application No. 11201910380S, Written Opinion, issued Apr. 26, 2021, 6 pages.
EPO Patent Application No. 18803094.4, Supplementary Search Report, issued Mar. 24, 2021, 7 pages.
EPO Patent Application No. 18803094.4, Written Opinion, issued May 6, 2021, 18 pages.
International Search Report and Written Opinion in PCT/US2018/032607. Mailed Aug. 9, 2018. 21 pages.
Figueroa et al. "Predicting Sample Size Required for Classification Performance," BMC Medical Informatics and Decision Making, http://www.biomedcentral.com/1472-6947/12/8, Dec. 31, 2012.
Second Examination Report issued n Australian Patent Application No. 2018269941, mailed on Sep. 8, 2022, 5 pages.
Decision to Grant a Patent issued in Japanese Patent Application No. 2019-564084, mailed Dec. 20, 2022, 4 pages.
Communication pursuant to Article 94(3) EPC in European Application No. 18803094.4 dated May 31, 2023, 13 pages.
Office Action issued in Canadian Application No. 3063738, dated Jan. 5, 2024, 7 pages.

* cited by examiner

| Cognition ▾ | Datasets |
|---|---|
| ⊙ Annotations | Datasets — 1002 |
| ⊟ Datasets | Datasets imported |

- beigebook
- bush52
- bush52_load_test
- bush52_load_test_1
- bush52_load_test_2
- bush52_load_test_3
- bush_52
- bush52_420_alpha7
- docs test
- docs test
- earnings1000
- earnings1000_again
- enron
- enron517_alpha8_prose

Instructions
Cognition imports data from your Synthesys knowledge graphs. Please make sure you've imported at least one to get started.

Next Steps
Create an annotation set

Figure 10

Annotations > Complaints > Settings

Settings

What are you looking for?
Many times you're looking for a needle in a haystack. Providing a list of keywords and/or examples helps to kickstart your model.

| Examples | Keywords | Samples | Annotations |
|---|---|---|---|
| 0 | 107 | 19,000 | 1,070 |
| Edit examples —1302 | Edit keywords | Annotate —1306 | Review —1308 |
|  |  | 1304 |  |

Labels
This section will eventually allow multiclass classification. For the moment, the labels are fixed.

[hit][miss] —1312
Add a label —1310

Datasets
What dataset or datasets would you like to annotate?

[Development Data September 2016    🗑] —1316
Add a dataset —1314
Datasets connected: 1

Frequency
How frequently does what you're looking for occur?
○ Every sample
○ Most samples
○ Many samples
◉ Less frequently —1318

Instructions
The sections to the left walk you through setting up your project.
⊘ Add labels
⊘ Connect datasets —1320
⊘ Specify frequency
⊘ Describe your goal

Next Steps
Choose a different set
Go to annotations

[Go to annotations] —1322    [Go to review] —1324

Figure 13

Complaints Annotations

Any additional senses of pregnant you'd like to add? — 1502

EXPECTING A BABY *adjective* — 1504
*when I told Chris I was pregnant, I expected him to panic*
⊙ expecting a baby, ⊙ having a baby, ⊙ with a baby on the way, ⊙ having a child, ⊙ expectant, ⊙ carrying a child, ⊙ enceinte, ⊙ expecting, ⊙ in the family way, ⊙ expecting a happy event, ⊙ preggers, ⊙ preggy, ⊙ with a bun in the oven, ⊙ with a one in the oven, ⊙ up the pole, ⊙ in the club, ⊙ up the duff, ⊙ in the pudding club, ⊙ up the spout, ⊙ up the stick, ⊙ knocked up, ⊙ having swallowed a watermelon seed, ⊙ preggo, ⊙ clucky, ⊙ with a joey in the pouch ⊙ in trouble, ⊙ in pod, ⊙ gravid, ⊙ parturient, ⊙ expect, ⊙ carry, ⊙ bear
— 1508

FILLED *adjective* — 1506
*a sacred rite, pregnant with religious significance*
⊙ filled, ⊙ charged, ⊙ heavy, ⊙ fraught, ⊙ replete, ⊙ teeming, ⊙ full of, ⊙ abounding in, ⊙ rich in, ⊙ filed

MEANINGFUL *adjective*
*there was a pregnant pause*
⊙ meaningful, ⊙ significant, ⊙ eloquent, ⊙ suggestive, ⊙ expressive, ⊙ loaded, ⊙ meaning, ⊙ charged, ⊙ pointed, ⊙ telling, ⊙ revealing, ⊙ weighty

[Cancel] 1510   [OK] 1512

Figure 15

Complaints Annotations

Make a list of key words and phrases

Keywords help us to narrow in on training samples relevant to your goal. We'll start by casting a wide net, and then teach the computer to filter out the noise.

[ Type a keyword and press enter ] — 1402 absolut
grey goose
svedka

— 1412

Hey! Are you looking for one of these?
[vodka] [liquor] [liquid] [fluid] [drug of abuse]
— 1602

Cognition
◎ Annotations
🗄 Datasets
⚛ Models

Annotation Sets > Rumors > Examples

Rumors Examples

Type examples   Paste a list   Upload a file   Connect to market

| Type an example here | | Add |
|---|---|---|

| Yes | He is nothing more than rude and flibbertigibbet. |
| Yes | He sold his shares immediately after the transaction, and now people are slandering him behind his back! |
| Yes | All this contrasted strangely with the dark, mysterious stories which were bruited abroad, touching some passages in his early life. |
| Yes | That's nothing but downright falsehood |
| Yes | Jay-Z plays irritatingly coy with conspiracy theories: he repudiates the old illuminati canard, but it's rather disingenuous given, for example, the title of this album. |
| Yes | Someone blabbed that we had confidential information about values that are about to change. |
| Yes | I got some dirt on what happened to Bob. |
| Yes | Word on the street is that the brink has totally collapsed. |
| Yes | Apparently they dished the dirt on the deal, and it's under investigation. |
| Yes | without him around, his colleagues were free to gossip. |
| Yes | You would be perfectly justified staying out of this completely not saying anything to your bruised colleague or to the gossipers. |

Total examples: 977

[ Finished ]

Instructions

Examples help by giving an idea of what you're looking for.

For example, if you're looking for complaints, you might add "I'm very upset by this"

Next Steps

Back to settings

Figure 17

Rumors Annotations

Annotation Sets » Rumors » Annotate

View One at a time ▼

I would love to use them of all possible. So for the late re-sponse, I was out of the office yesterday. We decided last night not to go to the Colorado game next week.

1902

| 1 | 2 | 3 | 4 | 5 |

How good of an example is this? (5=highest)

Training Options
Candidate Selection Method | Random | Learn | Yes | No |

Train model»   1904

Summary
Coverage
Examples Trained   1
"Yes" Examples   0
"No" Examples   1

Performance (Holdout)
Accuracy   0.0%
Precision   0.0%
Recall   0.0%
F1 score   0.0%
Cross-validate »

Annotation Sets > Inflation > Review

Inflation Annotations

View Review

Download

| Label | Sample | Annotation Date |
|---|---|---|
| Yes | Price inflation for final goods | 2017-05-09 |
| Yes | Overall price inflation remained modest, while wage inflation was moderate. | 2017-05-09 |
| No | Overall price inflation was slight, while wage inflation was moderate. | 2017-05-09 |
| Yes | Consumer price inflation pressures remained subdued. | 2017-05-09 |
| Yes | Prices and Wages Overall price inflation continued to firm somewhat. | 2017-05-09 |
| Yes | Wage inflation remained moderate overall. | 2017-05-09 |
| Yes | Few signs of inflation were noted. | 2017-05-09 |
| Yes | Price inflation remained modest according to contacts. | 2017-05-09 |
| Yes | Overall price inflation was modest. | 2017-05-09 |
| Yes | Overall price and wage inflation remained modest. | 2017-05-09 |
| Yes | Retail price inflation edged up in Richmond. | 2017-05-09 |
| Yes | Overall price and wage inflation remained modest. | 2017-05-09 |
| Yes | Most respondents expect inflation to remain stable, although roughly one-third anticipate an increase in inflation in coming quarters. | 2017-05-09 |
| Yes | Rising gas prices and inflation remain a concern. | 2017-05-09 |

Figure 25

SYSTEMS AND METHODS FOR RAPIDLY BUILDING, MANAGING, AND SHARING MACHINE LEARNING MODELS

CROSS-REFERENCE TO RELATED APPLICATIONS

This application is a national stage application filed under 35 U.S.C. § 371 of PCT/US2018/032607 filed May 14, 2018, which claims priority and benefit to U.S. Provisional Patent Application No. 62/505,936, filed May 14, 2017, which is herein incorporated by reference in its entirety.

BACKGROUND

Conventional machine learning technologies separately handle facilitating data annotation, data exploration, and model creation. In some interfaces for data annotation, users may highlight spans of text that interest them and assign annotations to the highlighted text. Alternatively, users may highlight portions of images that interest them and assign annotations to the highlighted portions of the images. Often these approaches employ manual "brute force" annotation of the data and require users to walk sequentially through data, resulting in substantial cost and time delays for generating a machine learning model. Additionally, such existing tools can require extensive knowledge about data preprocessing, feature extraction, and types of visualizations to run.

Among other drawbacks, shortcomings, and disadvantages of some conventional approaches, they can suffer from the following issues: they often require previously-annotated data, and do not provide a starting point when such data is absent; they often are not targeted at unstructured data; models are often slow to train and require substantial hardware resources; they may not effectively handle working with imbalanced data (i.e., data where the occurrence rate of the desired outcome is low, for example, under 10% of the time); and they may not provide an integrated workflow.

SUMMARY

The present disclosure relates to systems and methods for rapidly building, managing, and sharing machine learning models. The disclosure provides a method of managing lifecycle of machine learning models. In some aspects, the method comprises: receiving a set of unannotated data; requesting annotations of samples of the unannotated data to produce an annotated set of data; building a machine learning model based on the annotated set of data; deploying the machine learning model to a client system, wherein production annotations are generated; collecting the generated production annotations and generating a new machine learning model incorporating the production annotations; and selecting one of the machine learning model built based on the annotated set of data or the new machine learning model.

According to any of the above aspects of the disclosure, the method can further comprise reporting one or more measures of quality of the machine learning model including precision, recall, average precision, receiver operator characteristic scores, or F-beta scores.

According to any of the above aspects of the disclosure, the method can further comprise sharing the model with a third party.

According to any of the above aspects of the disclosure, the method can further comprise sharing the model with a third party.

According to any of the above aspects of the disclosure, requesting annotations of samples can comprise selecting a sample from the set of unannotated data based on user input or an automated sampler selection.

According to any of the above aspects of the disclosure the user input can comprise one or more of a semantic search, a selection of a similar sample, or a selection on a visual map of the unannotated data.

According to any of the above aspects of the disclosure, the automated sampler selection can be from one of a plurality of samplers in a progression.

According to any of the above aspects of the disclosure, each of the plurality of samplers can use a different sampling algorithm.

According to any of the above aspects of the disclosure, the respective sampling algorithm can be selected from a density sampling algorithm; entropy sampling algorithm; estimated error reduction sampling algorithm; exhaustive sampling algorithm; flagged predictions algorithm; hard negative mining sampling algorithm; high confidence sampling algorithm; linear sampling algorithm; map visualization sampling algorithm; metadata search sampling algorithm; minimum margin sampling algorithm; query by committee sampling algorithm; random sampling algorithm; review sampling algorithm; search sampling algorithm; similarity sampling algorithm; sampling of samples for which the input was to skip the sample type algorithm; stratified sampling algorithm; most confident samples algorithm; or most uncertain samples algorithm.

According to any of the above aspects of the disclosure, the progression can comprise successively changing between samplers of the plurality of the samplers.

According to any of the above aspects of the disclosure, each sampler of the plurality of samplers can have an expected distribution of outcomes that determine whether to move to a previous or next sampler in the progression.

According to any of the above aspects of the disclosure, upon receiving a predetermined number of sample annotations with incorrect model predictions, the progression can change between samplers to a previous sampler in the progression.

According to any of the above aspects of the disclosure, upon receiving a predetermined number of sample annotations with consistent model predictions, the progression can change between samplers to a next sampler in the progression.

According to any of the above aspects of the disclosure, building the machine learning model can comprise receiving a shared model and initializing weights of an intermediate model to weights of the shared model and trained with different learning rates.

According to any of the above aspects of the disclosure, requesting annotations of samples of the unannotated data can comprise requesting exhaustive annotations of a test set of data.

According to any of the above aspects of the disclosure, the exhaustive annotations of the test set of data can be performed by distant supervision comprising one or more of density sampling, level set trees, or random sampling.

According to any of the above aspects of the disclosure, requesting annotations of samples of the unannotated data can comprise presenting a recommendation on a graphical user interface of a sampler from a plurality of samplers for selecting a sample from the set of unannotated data.

According to any of the above aspects of the disclosure, the method can further comprise presenting data quality and quantity metrics on the graphical user interface.

According to any of the above aspects of the disclosure, the data quantity metrics can comprise one or more of a number of samples trained, a number of positive examples, a number of negative examples, or a number of samples trained for a class of samples.

According to any of the above aspects of the disclosure, the data quality metrics can comprise one or more of an accuracy, precision, recall, or F1 score.

According to any of the above aspects of the disclosure, the method can further comprise presenting, on a graphical user interface, inconsistencies across annotations of the unannotated set of data.

According to any of the above aspects of the disclosure, building the machine learning model can comprise selecting an algorithm and loss function to establish the machine learning model.

According to any of the above aspects of the disclosure, selecting the algorithm is based on a model type.

According to any of the above aspects of the disclosure, the method can further comprise testing convergence by training a model multiple times on a set of annotated training data that is annotated from the unannotated set of data and measuring a dispersion of quality metrics across runs.

According to any of the above aspects of the disclosure, the quality metrics can include a slope of a learning curve.

According to any of the above aspects of the disclosure, the model can be trained using default hyperparameters selected for a given model type and the algorithm.

According to any of the above aspects of the disclosure, the hyperparameters can be selected using one or more of random selection, grid search, or Bayesian estimation methods.

According to any of the above aspects of the disclosure, one or more of random seeds, algorithm selection, loss function, hyperparameters, dataset splits, dataset hashes, or class weights can be stored for the model.

According to any of the above aspects of the disclosure, the machine learning model can be versioned, changed over, or rolled back.

According to any of the above aspects of the disclosure, the method can further comprise monitoring for changes between models via data drift or concept drift.

According to any of the above aspects of the disclosure, concept drift can be calculated by training models based on quantifying a number of changed predictions between the annotated set of data and the production annotations.

According to any of the above aspects of the disclosure, data drift can be measured based on corpus statistics and/or corpus comparisons between the annotated set of data and the production annotations.

According to any of the above aspects of the disclosure, an alert can be generated upon identifying data drift or concept drift.

According to any of the above aspects of the disclosure, the data drift or concept drift can comprise metrics on unannotated data over time or metrics on model predictions over time.

According to any of the above aspects of the disclosure, sharing the model can comprise performing one or more of feature hashing, cryptographic hashing, or random projections.

According to any of the above aspects of the disclosure, sharing the model can comprise sharing a gradient update of the model.

According to any of the above aspects of the disclosure, the gradient update can be added to a layer in a computational graph.

According to any of the above aspects of the disclosure, sharing the model can comprise sharing one or more model assets.

According to any of the above aspects of the disclosure, the one or more model assets can comprise word embeddings trained on datasets, word vectors, sets of annotations, lists of keywords and phrases, lists of examples, language models, lexicons, as well as trained models, and model architectures.

According to any of the above aspects of the disclosure, the one or more model assets can be sanitized of personally identifiable information.

According to any of the above aspects of the disclosure, the progression can comprise progressing from a seed sampler to a hard negative sampler to a stratified sampler, to an uncertainty sampler.

According to any of the above aspects of the disclosure, requesting annotations of samples can comprise presenting questions to a user on a graphical user interface for annotation feedback.

According to any of the above aspects of the disclosure, the method can further comprise predicting one or more annotations for a sample of the unannotated data.

According to any of the above aspects of the disclosure, the predicting of the one or more annotations can be prior to requesting annotations of samples of the unannotated data.

According to any of the above aspects of the disclosure, the method can further comprise storing the predicted one or more annotations in a priority queue based on a sampling score.

According to any of the above aspects of the disclosure, the sampling score can be a confidence score of the predicted one or more annotations.

According to any of the above aspects of the disclosure, prior to storing the predicted one or more annotations in the priority queue, it can be determined, according to the method, whether the sampling score is greater than a threshold sampling score.

According to any of the above aspects of the disclosure, the method can further comprise discarding a prediction having a sampling score that is determined to be less than the threshold sampling score.

According to any of the above aspects of the disclosure, the priority queue can store a predetermined maximum number of predictions.

According to any of the above aspects of the disclosure, the method can further comprise determining that a number of predictions stored in the priority queue is less than the predetermined maximum number of predictions prior to storing the prediction in the priority queue.

According to any of the above aspects of the disclosure, the method can further comprise determining that the sampling score is greater than at least one previously stored prediction in the priority queue prior to storing the prediction in the priority queue.

According to any of the above aspects of the disclosure, the method can further comprise discarding a previously stored prediction in the priority queue having a lowest sampling score.

According to any of the above aspects of the disclosure, requesting annotations of samples of the unannotated data can comprise selecting the priority queue from among a plurality of priority queues.

The disclosure also provides a system for managing lifecycle of machine learning models. In some aspects, the system comprises a processor; and a non-transitory memory device coupled to the processor and storing computer-readable instructions which, when executed by the processor, cause the system to perform functions that comprise: receiving a set of unannotated data; requesting annotations of samples of the unannotated data to produce an annotated set of data; building a machine learning model based on the annotated set of data; deploying the machine learning model to a client system, wherein production annotations are generated;

collecting the generated production annotations and generating a new machine learning model incorporating the production annotations; and selecting one of the machine learning model built based on the annotated set of data or the new machine learning model.

According to any of the above aspects of the disclosure, the functions performed by the system can further comprise reporting one or more measures of quality of the machine learning model including precision, recall, average precision, receiver operator characteristic scores, or F-beta scores.

According to any of the above aspects of the disclosure, the functions performed by the system can further comprise sharing the model with a third party.

According to any of the above aspects of the disclosure, the functions performed by the system can further comprise sharing the model with a third party.

According to any of the above aspects of the disclosure, requesting annotations of samples can comprise selecting a sample from the set of unannotated data based on user input or an automated sampler selection.

According to any of the above aspects of the disclosure, the user input can comprise one or more of a semantic search, a selection of a similar sample, or a selection on a visual map of the unannotated data.

According to any of the above aspects of the disclosure, the automated sampler selection can be from one of a plurality of samplers in a progression.

According to any of the above aspects of the disclosure, each of the plurality of samplers can use a different sampling algorithm.

According to any of the above aspects of the disclosure, the respective sampling algorithm can be selected from a density sampling algorithm; entropy sampling algorithm; estimated error reduction sampling algorithm; exhaustive sampling algorithm; flagged predictions algorithm; hard negative mining sampling algorithm; high confidence sampling algorithm; linear sampling algorithm; map visualization sampling algorithm; metadata search sampling algorithm; minimum margin sampling algorithm; query by committee sampling algorithm; random sampling algorithm; review sampling algorithm; search sampling algorithm; similarity sampling algorithm; sampling of samples for which the input was to skip the sample type algorithm; stratified sampling algorithm; most confident samples algorithm; or most uncertain samples algorithm.

According to any of the above aspects of the disclosure, the progression can comprise successively changing between samplers of the plurality of the samplers.

According to any of the above aspects of the disclosure, each sampler of the plurality of samplers can have an expected distribution of outcomes that determine whether to move to a previous or next sampler in the progression.

According to any of the above aspects of the disclosure, upon receiving a predetermined number of sample annotations with incorrect model predictions, the progression can change between samplers to a previous sampler in the progression.

According to any of the above aspects of the disclosure, upon receiving a predetermined number of sample annotations with consistent model predictions, the progression can change between samplers to a next sampler in the progression.

According to any of the above aspects of the disclosure, building the machine learning model can comprise receiving a shared model and initializing weights of an intermediate model to weights of the shared model and trained with different learning rates.

According to any of the above aspects of the disclosure, requesting annotations of samples of the unannotated data can comprise requesting exhaustive annotations of a test set of data.

According to any of the above aspects of the disclosure, the exhaustive annotations of the test set of data can be performed by distant supervision comprising one or more of density sampling, level set trees, or random sampling.

According to any of the above aspects of the disclosure, requesting annotations of samples of the unannotated data can comprise presenting a recommendation on a graphical user interface of a sampler from a plurality of samplers for selecting a sample from the set of unannotated data.

According to any of the above aspects of the disclosure, the functions performed by the system can further comprise presenting data quality and quantity metrics on the graphical user interface.

According to any of the above aspects of the disclosure, the data quantity metrics can comprise one or more of a number of samples trained, a number of positive examples, a number of negative examples, or a number of samples trained for a class of samples.

According to any of the above aspects of the disclosure, the data quality metrics can comprise one or more of an accuracy, precision, recall, or F1 score.

According to any of the above aspects of the disclosure, the functions performed by the system can further comprise presenting, on a graphical user interface, inconsistencies across annotations of the unannotated set of data.

According to any of the above aspects of the disclosure, building the machine learning model can comprise selecting an algorithm and loss function to establish the machine learning model.

According to any of the above aspects of the disclosure, selecting the algorithm is based on a model type.

According to any of the above aspects of the disclosure, the functions performed by the system can further comprise testing convergence by training a model multiple times on a set of annotated training data that is annotated from the unannotated set of data and measuring a dispersion of quality metrics across runs.

According to any of the above aspects of the disclosure, the quality metrics can include a slope of a learning curve.

According to any of the above aspects of the disclosure, the model can be trained using default hyperparameters selected for a given model type and the algorithm.

According to any of the above aspects of the disclosure, the hyperparameters can be selected using one or more of random selection, grid search, or Bayesian estimation methods.

According to any of the above aspects of the disclosure, one or more of random seeds, algorithm selection, loss function, hyperparameters, dataset splits, dataset hashes, or class weights can be stored for the model.

According to any of the above aspects of the disclosure, the machine learning model can be versioned, changed over, or rolled back.

According to any of the above aspects of the disclosure, the functions performed by the system can further comprise monitoring for changes between models via data drift or concept drift.

According to any of the above aspects of the disclosure, concept drift can be calculated by training models based on quantifying a number of changed predictions between the annotated set of data and the production annotations.

According to any of the above aspects of the disclosure, data drift can be measured based on corpus statistics and/or corpus comparisons between the annotated set of data and the production annotations.

According to any of the above aspects of the disclosure, an alert can be generated upon identifying data drift or concept drift.

According to any of the above aspects of the disclosure, the data drift or concept drift can comprise metrics on unannotated data over time or metrics on model predictions over time.

According to any of the above aspects of the disclosure, sharing the model can comprise performing one or more of feature hashing, cryptographic hashing, or random projections.

According to any of the above aspects of the disclosure, sharing the model can comprise sharing a gradient update of the model.

According to any of the above aspects of the disclosure, the gradient update can be added to a layer in a computational graph.

According to any of the above aspects of the disclosure, sharing the model can comprise sharing one or more model assets.

According to any of the above aspects of the disclosure, the one or more model assets can comprise word embeddings trained on datasets, word vectors, sets of annotations, lists of keywords and phrases, lists of examples, language models, lexicons, as well as trained models, and model architectures.

According to any of the above aspects of the disclosure, the one or more model assets can be sanitized of personally identifiable information.

According to any of the above aspects of the disclosure, the progression can comprise progressing from a seed sampler to a hard negative sampler to a stratified sampler, to an uncertainty sampler.

According to any of the above aspects of the disclosure, requesting annotations of samples can comprise presenting questions to a user on a graphical user interface for annotation feedback.

According to any of the above aspects of the disclosure, the functions performed by the system can further comprise predicting one or more annotations for a sample of the unannotated data.

According to any of the above aspects of the disclosure, the predicting of the one or more annotations can be prior to requesting annotations of samples of the unannotated data.

According to any of the above aspects of the disclosure, the functions performed by the system can further comprise storing the predicted one or more annotations in a priority queue based on a sampling score.

According to any of the above aspects of the disclosure, the sampling score can be a confidence score of the predicted one or more annotations.

According to any of the above aspects of the disclosure, prior to storing the predicted one or more annotations in the priority queue, it can be determined, according to the method, whether the sampling score is greater than a threshold sampling score.

According to any of the above aspects of the disclosure, the functions performed by the system can further comprise discarding a prediction having a sampling score that is determined to be less than the threshold sampling score.

According to any of the above aspects of the disclosure, the priority queue can store a predetermined maximum number of predictions.

According to any of the above aspects of the disclosure, the functions performed by the system can further comprise determining that a number of predictions stored in the priority queue is less than the predetermined maximum number of predictions prior to storing the prediction in the priority queue.

According to any of the above aspects of the disclosure, the functions performed by the system can further comprise determining that the sampling score is greater than at least one previously stored prediction in the priority queue prior to storing the prediction in the priority queue.

According to any of the above aspects of the disclosure, the functions performed by the system can further comprise discarding a previously stored prediction in the priority queue having a lowest sampling score.

According to any of the above aspects of the disclosure, requesting annotations of samples of the unannotated data can comprise selecting the priority queue from among a plurality of priority queues.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts. The accompanying drawings, which are not necessarily drawn to scale, illustrate several embodiments of the present disclosure, and together with the description, serve to explain the principles of the disclosed technology according to the embodiments.

FIG. 10 illustrates an example graphical user interface depicting a manner by which users can manage multiple datasets, in accordance with an example embodiment of the disclosed technology.

FIG. 13 illustrates an example graphical user interface depicting configuration options users can use to set up annotations, in accordance with an example embodiment of the disclosed technology.

FIG. 15 illustrates an example graphical user interface depicting a manner by which users can discover and manage related words and phrases, in accordance with an example embodiment of the disclosed technology.

FIG. 16 illustrates an example graphical user interface depicting an incorporation of ontologies into word list management, in accordance with an example embodiment of the disclosed technology.

FIG. 17 illustrates an example graphical user interface depicting methods of inputting and managing lists of examples, in accordance with an example embodiment of the disclosed technology.

FIG. 19 illustrates an example graphical user interface depicting an annotation process that permits users to score the strength of their responses, in accordance with an example embodiment of the disclosed technology.

FIG. 22 illustrates an example graphical user interface depicting a one-time keyword search across data, in accordance with an example embodiment of the disclosed technology.

FIG. 23 illustrates an example graphical user interface depicting a data map that can allow users to explore their data visually, in accordance with an example embodiment of the disclosed technology.

FIG. 24 illustrates an example graphical user interface depicting how fail states can be handled and information is conveyed back to the user, in accordance with an example embodiment of the disclosed technology.

FIG. 25 illustrates an example graphical user interface depicting a list of previously annotated entries and how those entries are managed, in accordance with an example embodiment of the disclosed technology.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Creating machine learning models can be an involved and time-consuming task. Conventionally this has involved aggregating, preprocessing, annotating, and inspecting data, feature extraction and vectorization, and model training and evaluation. As a result, the ability to create such models has often been limited for use by those with expertise in data science. Among other advantages and benefits provided by embodiments of the disclosed technology, users without extensive knowledge of data science can create powerful models, while also enabling data scientists to perform their job more quickly.

According to various embodiments of the disclosed technology, a user can connect appropriate data sources, set up an annotation process, annotate data, build machine learning models from those annotations, deploy the machine learning model, collect and incorporate production feedback into new versions of the model, and share the model and learnings.

Figure 1:
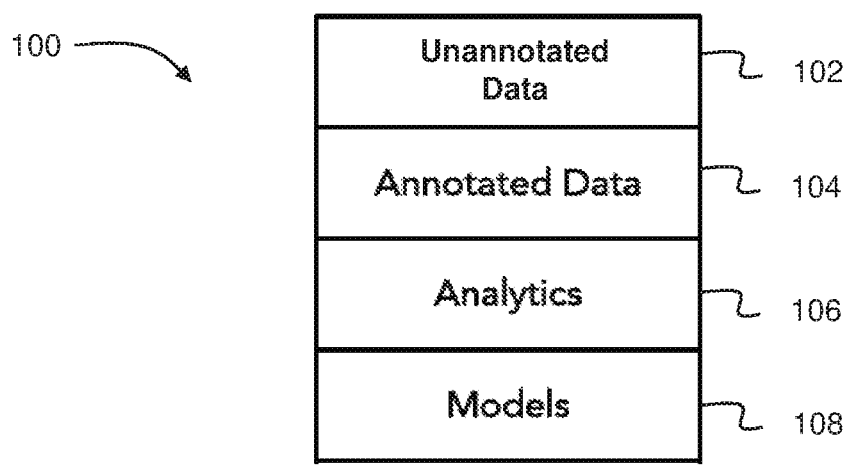
FIG. 1 illustrates an information stack for creating machine learning models, in accordance with an example embodiment of the disclosed technology.

FIG. 1 illustrates an information stack 100 for creating machine learning models, in accordance with an example embodiment of the disclosed technology. The information stack 100 includes unannotated data 102, annotated data 104, analytics, 106, and models 108. The unannotated data 102 includes un-processed data from a data source. For example, the unannotated data 102 may include sets of e-mail communications, chat logs, document stores, or other sources of text data. The text data may come from plain text files, such as from electronic communications through email or chat, flat files, or other types of document files (e.g., .pdf, .doc, etc.). The unannotated data 102 may also include an image library, a video library or other sources of image or video data. The unannotated data 102 may also include phone calls, pod casts, and other sources of audio data. The unannotated data 102 may be provided from pre-existing data stores or also include live-streams of unannotated data of any desired format. In some implementations, the unannotated data 102 may include directories of files and can include graphical formats of data. Other sources of electronic data may be used.

A bottleneck in the creation of new machine learning models 108 is the annotation of the unannotated data into annotated data 104. The annotated data 104 can comprise one or more datasets coupled with annotations or annotations provided by a user, for example through the application described herein. As opposed to using data science experts, subject matter experts in a domain may participate in the annotation process described herein to facilitate their knowledge transfer and increase the speed and reduce the costs of the machine learning model creation process. The disclosed annotation process is performed in a language-agnostic and domain-agnostic manner.

Analytics 106 can be performed to ensure sufficient annotation has occurred prior to creating models 108.

Figure 2:
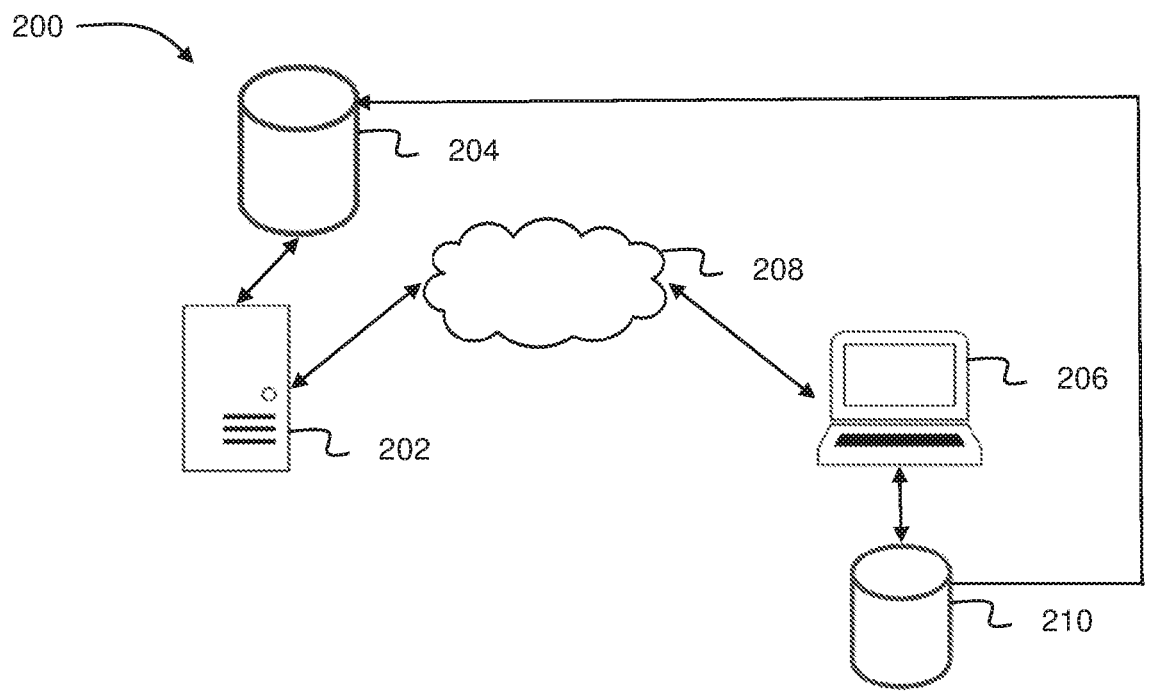
FIG. 2 illustrates a computer architecture to facilitate data annotation and creation of machine learning models, in accordance with an example embodiment of the disclosed technology.

FIG. 2 illustrates a computer architecture 200 to facilitate data annotation and creation of machine learning models, in accordance with an example embodiment of the disclosed technology. The computer architecture 200 includes an annotation server 202 that executes the annotation process described herein. The annotation server 202 is in communication with a database 204 that is configured to store the information stack 100 therein. While shown as a single database, one or more databases may be used for each element of the information stack 100. The annotation server 202 may receive the unannotated data 102 over a network 208 from an annotation client 206 for storage in the database 204. The annotation server 202 interacts with the annotation client 206 through one or more graphical user interfaces to the facilitate generation of the annotated data 104. Upon sufficient annotation of the unannotated data 102, as specified by one or more annotation training criteria (e.g., 20 annotations for each class), the annotation server 202 is configured to generate one or more intermediate models These intermediate models generate predictions on unannotated data which may be communicated over the network 208 to the annotation client 206 or another client computer (not shown) to facilitate production annotation. During normal production operation on the client computer 206, additional production annotated data is generated and stored in a production annotation database 210. For example, as new data is entered or manipulated on the client computer 206, the baseline model presents a prediction of an annotation for the new data which is accepted or amended to generate additional production annotated data. Periodically, the production annotations are fed back to the annotation server 202 and used to generate an updated model that takes into account the additional production annotated data. The production annotations may be fed back to the annotation server 202 by importing a file with the production annotations or through a standard API exposed on the annotation server 202. The API may be rate limited to prevent attacks.

Figure 3:
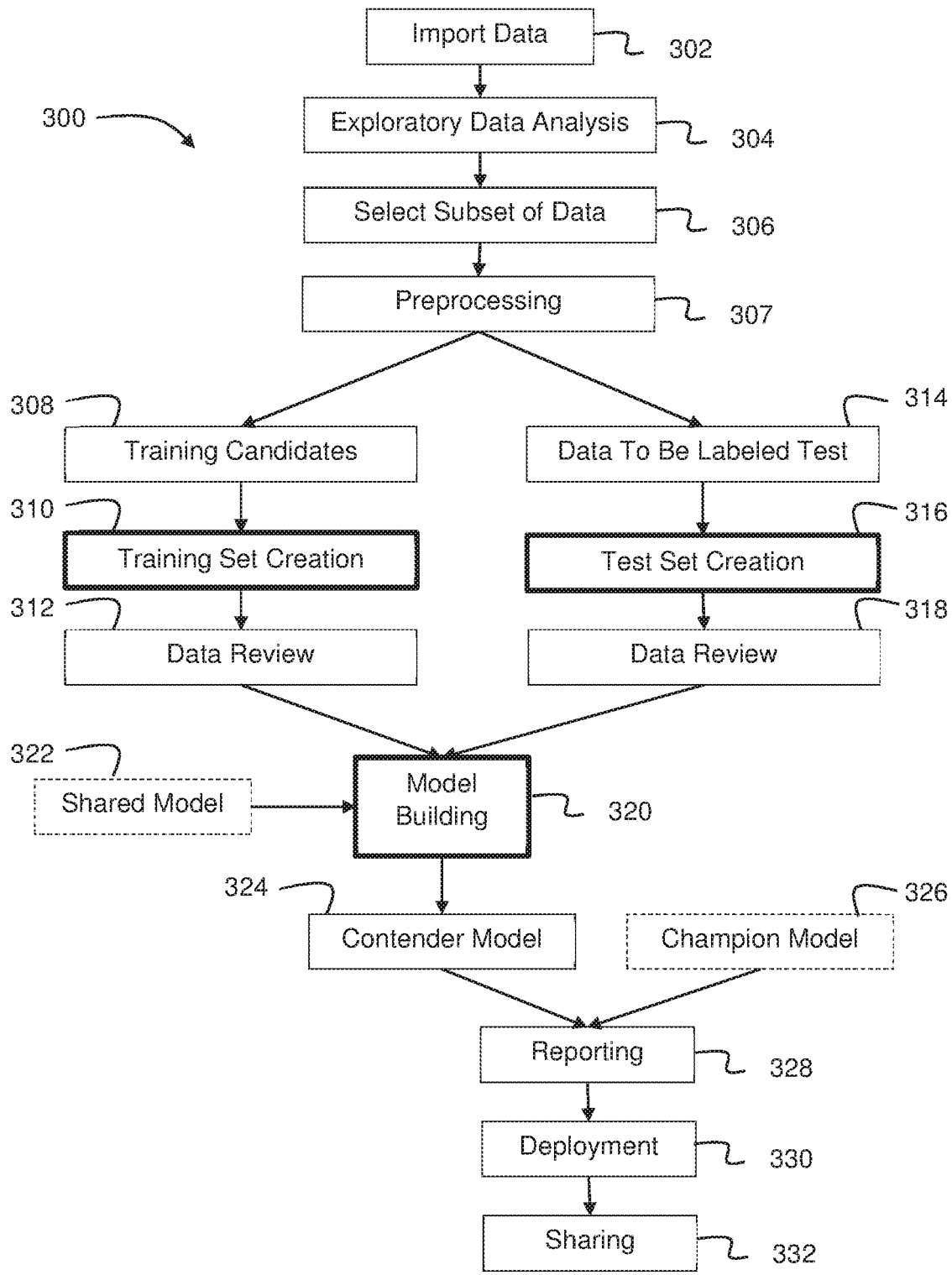
FIG. 3 illustrates a flow diagram of an integrated workflow process for data annotation and model building, in accordance with an example embodiment of the disclosed technology.

FIG. 3 illustrates a flow diagram of an integrated workflow process 300 for data annotation and model building, in accordance with an example embodiment of the disclosed technology. At 302, the unannotated data 102 is imported to the annotation server 202 for storage on the database 204.

At 304, an exploratory data analysis of the unannotated data 102 is performed. This enables the data to be properly stratified into subsets for annotation. For example, with text, the exploratory data analysis may identify the distribution of foreign languages using methods such as logistic regression, the distribution of document types (email, chat, Portable Document Format documents, hypertext markup language and so so), as well the distribution of Flesch-Kincaid readability scores. With image data, the exploratory data analysis may identify the distribution of color versus black and white images, the size and resolution of the images, and the distribution of entropy in images. These distributions are used to select stratified subsets for annotation. For example, the user may elect to annotate Spanish chat messages for the week spanning Apr. 2, 2018 through Apr. 7, 2018.

At 307, the unannotated data of 102 is preprocessed using pre-defined or user-specified cleaning pipelines. This is a form of dimensionality reduction that normalizes the data for analysis as well as segmentation into areas of interest. For example, pre-processing of text may include performing such tasks as removing disclaimers, non-sensical text, or inline replies in emails. For text data this can also include tokenizing the text and splitting it into sentences, paragraphs or documents, conversion to lower case characters, spaces may be inserted between punctuation, and whitespace may be inserted for non-whitespace languages like Japanese.

At 306, subsets of the pre-processed data are selected to provide a set of training candidates at 308 and a set of test data at 314. At 310, an annotated training set is created through a guided annotation process described in more detail below in conjunction with FIGS. 4-7. The guided annotation process allows a subject matter expert to annotate a large set of training candidates in a short amount of time, at reduced cost, and with reduced computational resources. Whereas prior annotation methods that rely on "brute force" annotation of data sets by data analysts typically takes person-years to sufficiently annotate an imbalanced data set, the guided annotation process disclosed herein may facilitate sufficient annotation of a data set over the course of person-hours or person-days.

At 316, the data reserved for test set creation is annotated to produce an annotation test set for testing either explicitly or by proxy using distant supervision, as described in more detail below in conjunction with FIG. 8. In some implementations, the set of test data is exhaustively annotated. In some instances, active learning produces biased data distributions that are not suitable for creating unbiased test sets. Instead, level set trees, unsupervised clustering with random sampling, and density-based sampling facilitate sufficient and efficient annotating of the set of test data.

At 312 and 318, a data review is performed on the annotated training set and the annotated test set. The data review includes annotation "cleaning" that identifies inconsistencies between annotations across multiple reviewers, even if the underlying samples are semantically similar but not identical. Annotation consistency can also be checked within users (for fatigue or poor judgment) or across users. Annotation consistency can be measured using user annotations coupled with a similarity measurement on distributed representations (e.g., cosine similarity on vector embeddings). During this review, supervisors can establish "gold standard" annotations. In some implementations, the annotation "cleaning" may be performed as described in commonly owned U.S. Pat. No. 9,058,317 to Gardner et al., "System and Method for Machine Learning Management", hereby incorporated by reference in its entirety.

At 320, a machine learning model is built using the cleansed annotated training set and annotated test set. In some instances, a shared model 322 may supplied to inform the model building 320. When a shared model 322 is provided, the model being built is initialized to the weights of the shared model 322 and trained with differential learning rates. In some implementations, the model being built is trained using progressively lower learning rates. In some implementations, certain weights provided by the shared model 322 may remain untrained or lightly trained. If the model being built has untrained or lightly trained weights, a high learning rate may be selectively maintained to quickly train those weights.

At 324, a contender model is generated as a result of the model building 320. At 328, reporting on the generated model may be presented. In some implementations, multiple models may be built and compared using common measures of quality against the annotated test set. Measures of quality may include precision, recall, average precision, receiver operator characteristic scores, and F-beta scores, for example. Other measures of quality may be used. Examples of predictions where the models agree, as well as disagree may be presented to a user through the reporting 328. Additional visualizations may be provided for precision recall curves, ROC curve, and samples of true/false positives/negatives at varying thresholds for each of the models to facilitate model selection.

A user may at any point deem that sufficient training data has been collected and prepare to move forward with model building. During model building the annotation server 202 will guide the user through a series of steps in an automated fashion. In some embodiments, the user will designate certain annotation sets to be used for training a machine learning and others to be used for testing the quality of a machine learning model. In other embodiments, the annotation server 202 will divide all available annotated data for a given concept into sets of training data and test data.

Given training data and test data and a model type (e.g. text classifier, image classifier, semantic role labeling), the annotation server 202 selects an appropriate algorithm and loss function to use to establish a baseline. The specific algorithm has in most cases been predetermined for the type of model and the amount of training data. For example, logistic regression with bigram features may be selected as a baseline algorithm for text classification, whereas a hidden markov model with spectrogram features may be selected as a baseline algorithm for automatic speech recognition. Beyond baselines, each model type has an associated list of applicable algorithms that are predetermined by the annotation server 202.

When an algorithm and loss function have been selected, the annotation server 202 tests convergence, assesses the benefit of additional training data, and establishes a baseline model. Convergence may be tested by training a model multiple times on training data, measure quality metrics on test data, and measuring the dispersion of the quality metrics across runs, where dispersion is calculated via standard deviation. The benefit of additional training data is evaluated via learning curves, and presented back to the user for feedback. Evaluations using learning curves are described in more detail below. Finally, a "baseline model" is trained using default hyperparameters selected for a given model type and algorithm. Numerous metrics are calculated using baseline model predictions and the reference annotations of the test set. These metrics relate to the type of problem, but may include data quality metrics, data quantity metrics and model quality metrics, described in more detail below.

In some embodiments, metrics are run on a validation set. In other embodiments, there is no validation set, and training data is used for both training and validation via typical cross-validation methods.

As in the baseline selection process, the annotation server 202 uses the model type to select an appropriate search space. A search space consists of a family of algorithms, their associated loss functions, and potential hyperparameters for tuning the algorithm. During a single hyperparameter optimization run, an algorithm and sample hyperparameters are selected, a model is trained and metrics are calculated.

Algorithm and candidate hyperparameter selection is performed using any number of methods: random selection, grid search, or Bayesian estimation methods (e.g. a Tree of Parzen Estimators). In each run of model training, the parameters necessary to re-create the experiment and the results of the experiments are stored in a database. These parameters may include random seeds, algorithm selection, loss function, hyperparameters, dataset splits, dataset hashes (e.g., a measure across the dataset to determine whether any change has occurred), and class weights. The store results may include both baselines as well as iterations performed during hyperparameter optimization.

Hyperparameter estimation stops when either a quality objective has been achieved, changes in quality become small, or when computational budgets have been exhausted. In some embodiments, the user is presented with a graphical list of results from all algorithm and hyperparameters runs, from which they can choose a model. In other embodiments, the best model is chosen automatically to maximize or minimize an objective function. For example, in text classification, this may be the model that maximizes the area under the Receiver Operating Characteristic Curve.

In some implementations, upon generation of an initial contender model 324, the model may be deemed to be champion and deployed at 330. New annotations may be provided from outside systems, such as the annotation client 206 or another client computer (not shown). For example, suppose there is a compliance monitoring system wherein the daily activity of the compliance officers are to flag messages that are potential risks to the company. These flagged messages are production annotations that can be fed back to the annotation server 202 to supplement the annotated training set stored in the database 204 and used to generate a new contender model at 324. The baseline model, or initial contender model 324, may be considered the champion model 326. The reporting 328 may include comparisons, as described above, between the champion model 326 and newly built contender model 324 to facilitate selection of one of the models for deployment at 330.

As new production annotations are supplied to the annotation server 202, the subsequently generated models are monitored for changes via data drift and concept drift calculations. For example, concept drift may be calculated by training models based on newer and older versions of the annotated training set and quantifying a number of changed predictions on the older and newer data sets. Data drift may be measured based on corpus statistics and/or corpus comparisons between newer and older versions of the annotated training set. For example, for text data, the corpus statistics may include a percent fixed with documents; a percent of HTML tags; a percent of words out-of-vocabulary as compared to a reference vocabulary (e.g., chat vocabulary, standard vocabulary); a percent of words that have mixed letters and/or numbers; a percent of parts of speech; a percent of punctuation, letters (English, Cyrillic, etc.), numbers, and/or other text symbols; a percent of words that are uppercase, lowercase, capitalized, and/or other formats; a number of characters, words, sentences and/or paragraphs per word, sentence, paragraph, and/or document; a distribution of characters and/or words per new line; a distribution of duplicate sentences; a distribution of a number of sentences per e-mail or other document; formality; most common words and bigrams; and/or readability scores. Corpus statistics may additionally or alternatively include metrics on unannotated data over time or metrics on model predictions over time. Corpus comparisons include comparisons based on any one or a combination of the above corpus statistics, spearman rank correlation coefficient, and/or perplexity.

The user is alerted to such drifts in their data through a message or screen displayed on the client computer 206.

Additionally, models can be versioned, changed over, and rolled back as desired based on user inputs supplied through the client computer 206.

At 332, in addition to enabling rapid exploration and annotation of large datasets, and corresponding model creation, certain implementations enable generated models and/or generated model assets to be bought, sold, shared, and distributed. These model assets include, but are not limited to: word embeddings trained on datasets, word vectors, sets of annotations, lists of keywords and phrases, lists of examples, language models, lexicons, as well as trained models, and model architectures. In some implementations, the annotations are "sanitized" of personally identifiable information before new models are trained. Features may be securely hashed to prevent discovery of any original raw features. Homomorphic encryption can be used for simple models.

In some implementations, the "learnings" of these models are published or otherwise shared without sharing of the models themselves. For example, when a "publisher" makes adjustments to an underlying model, a gradient update of the model is submitted to a managed outside server, which re-distributes these gradient updates to "subscribers". The "subscribers" can use the gradient update to further train their local models. In some embodiments the gradient update may be encrypted. In some implementations, the gradient update is added to a layer in a computational graph. The gradient update may be multiplied by a local learning rate when training local models. Alternatively, the gradient update may share (X, y), where X is an input data point, a semantic representation of input data, or anonymized data.

Figure 4:
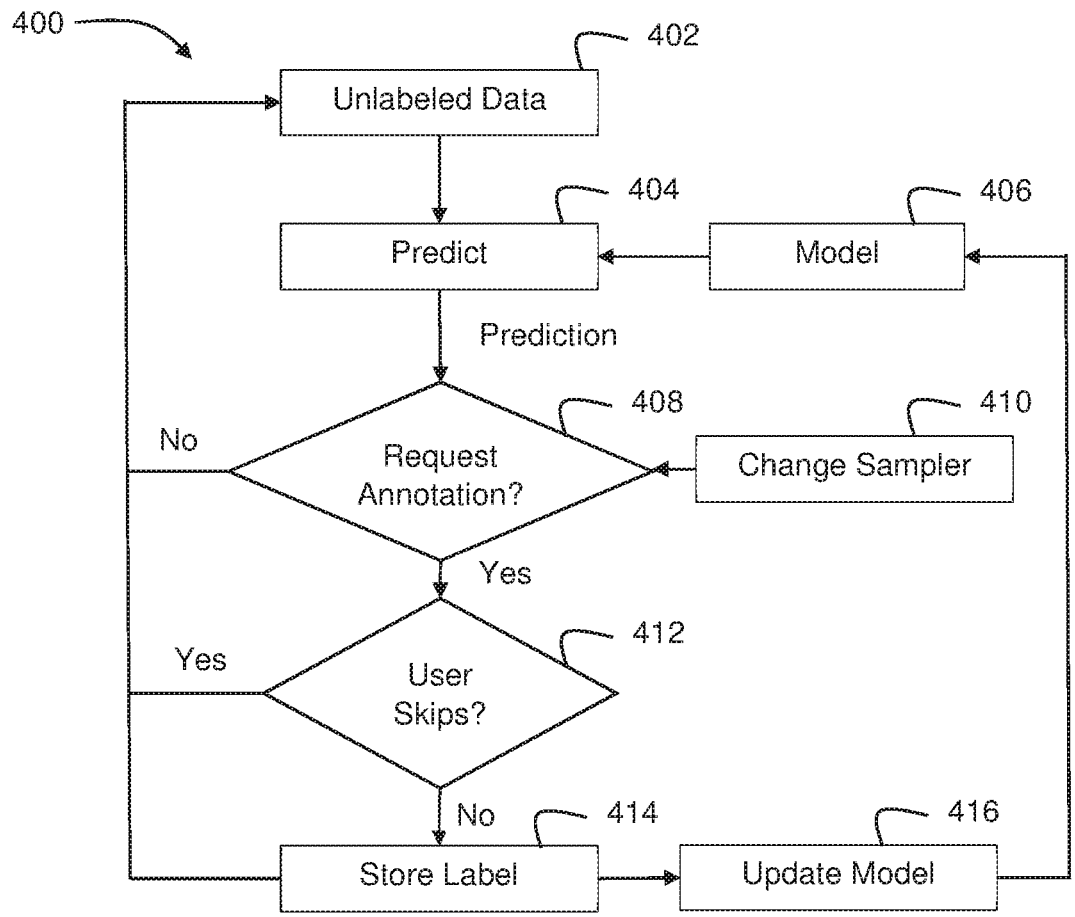
FIG. 4 illustrates a flow diagram of an annotation process for annotating a training set of data, in accordance with an example embodiment of the disclosed technology.

FIG. 4 illustrates a flow diagram of an annotation process 400 for annotating the set of training candidates, in accordance with an example embodiment of the disclosed technology. The annotation process 400 may take place during the creation of the annotated training set at 310 and be executed by the annotation server 202 or on a local install on the annotation client 206.

At 402, the unannotated set of training candidates is received. Each data element in the set of training candidates is referred to as a sample of the unannotated data 102. For example, with text, the samples include the pre-processed tokenized text (e.g., n-grams, sentences, paragraphs, etc.). At 404, a prediction set is generated by a model 406 predicting an annotation for samples in the set of training candidates or a subset thereof. The predictions in the prediction set may be streamed (e.g., determined one at a time) or provided in batches of predictions. The predictions in the prediction set may also be made for samples in one or more clusters of unannotated samples in the set of training candidates. The clusters may be identified during the pre-processing of the unannotated data 102. The model 406 also provides a prediction vector score for each prediction. For example, for classification tasks, the model 406 may use a binary classifier algorithm or a multi-class classifier algorithm to generate the prediction set. Examples of models that may be used are described in more detail below with reference to FIG. 9. In some implementations, the model is a continuous bag of words model with a linear classifier and trainable word embeddings. In other embodiments, the model may be a deep learning model (such as a convolutional or recurrent neural network) with trainable or fixed word embeddings. Other types of models for data other than text are contemplated by this disclosure.

At 408, the prediction set is evaluated based on the prediction vector of the predictions and a determination is made as to whether to request annotations of one or more of the samples. To facilitate rapid and focused training of the model through the annotation process, a sampled prediction set is generated by sampling the prediction set according to one of a plurality of sampling algorithms and arranging each sample in the sampled prediction sets in a queue in order of a sampling score. The sampling score may be equal to the confidence score or may be derived from a prediction vector to represent how well a prediction fits in the sampling algorithm. The sampling algorithm used to generate the sampled prediction set and the queue in which the sampled prediction set is arranged is referred to as a sampler or "example candidate generation engine." Annotations may then be requested for samples provided by the sampler.

The sampling algorithms include sampling based on density sampling, entropy sampling (e.g., identifying predictions with the highest level of Shannon entropy), estimated error reduction sampling, exhaustive sampling (e.g., linear progression), flagged (e.g., predictions for which a user input was provided to flag the prediction for later analysis), hard negative mining sampling, high confidence sampling (e.g., predictions with the highest confidence score), linear sampling, map visualization sampling (e.g., from user input received on a data map, described in more detail below in conjunction with FIG. 23), metadata search sampling, minimum margin sampling, query by committee sampling, random sampling, review sampling, search sampling (e.g., from user input of search parameters and/or keywords described in more detail below in conjunction with FIGS. 13-16, and 22), similarity sampling, skipped sampling (e.g., predictions for which a user input was to skip annotating the prediction), stratified sampling, most uncertain (e.g., predictions with the lowest confidence score). This list of sampling algorithms is not intended to be an exhaustive list, other sampling algorithms may be used.

At 410, the sampler may be changed to a different sampler that uses a different sampling algorithm. The sampler may be changed based on receiving a user selection to change the sampler or based on an algorithmic determination to change the sampler. Changing the sampler does not require retraining the model, as described in more detail below with reference to FIGS. 6-7.

At 412, it is determined whether a user skips annotating a sample. If so, the process 400 loops to evaluate other unannotated data 402 for requesting annotations. Otherwise, at 414, the sample is annotated based on the user feedback. At 416, the model is updated based on the annotated samples. The model may be updated in a streaming manner such that an update is performed after each new annotation. Alternatively, the model may be updated in a batched manner, such as after a predetermined number of annotations, or the like. As another alternative, the model may be updated upon receiving a user input to update the model. As a further alternative, the model may be updated based on an algorithmic determination, such as on a periodic basis, based on tracking a number of correct predictions, or to reinforce learning.

The annotation process 400 may continue until the updated model 416 satisfies stopping criteria. The stopping criteria may provide information that facilitates human judgment around model quality. For example, the updated model 416 may be evaluated against the exhaustively annotated set of test data for data quality metrics and data quantity metrics. The data quality metrics may include a coherence metric. For example, for multi-class classification algorithms, a cluster coherence metric is generated based on Gini coefficient counts or a percent of maximum entropy on proportions.

The data quantity metrics may include a learning curve metric or a model convergence metric. For example, the learning curve metric may measure the accuracy of predictions of iterations of the updated model against the set of test data at each of a plurality of predetermined data annotation levels (e.g., at each of when 5, 10, 20, 50, 75, 100% of data is annotated). A slope of the learning curve is a measure of how much additional information the updated model is learning. If the learning curve flattens, then each additional iteration of the updated model learns a reduced amount of additional information. Therefore, a stopping criteria for terminating the annotation process 400 may be when a slope of the learning curve is below a predetermined threshold learning rate. The model convergence metric may be a standard deviation of metrics across runs, across cross-validation folds, and/or across cross-validation averages. Other stopping criteria for the annotation process 400 may be used.

Figure 5:
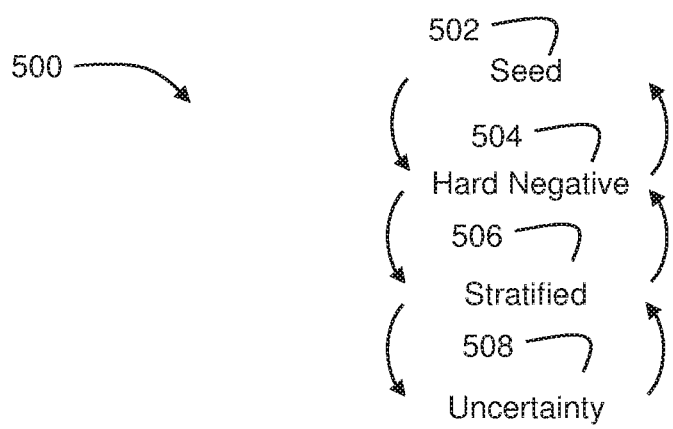
FIG. 5 illustrates a sequence diagram of a progression of sampling techniques to facilitate the annotation of the unannotated data, in accordance with an example embodiment of the disclosed technology.

FIG. 5 illustrates a sequence diagram of an algorithmic sampling progression 500 of sampling techniques to facilitate the annotation of the set of training candidates, in accordance with an example embodiment of the disclosed technology. Generally, for a selected sampler, if the model is identifying samples with a high confidence and receiving confirmatory feedback through the annotation inputs on the annotation client 206, the sampler progression 500 will proceed with changing the sampler to a sampler further down the progression 500. That is, each sampler has an expected distribution of outcomes that determine whether to move to the previous or next sampler in the progression. For example, if the selected sampler is a hard negative sampler 504, and the annotations provided by the user are consistent with model predictions, the sampler may be changed to the stratified sampler 506.

Likewise, if the annotations provided by the user differ from the model predictions, then the sampler may be changed to a sampler higher up the progression 500. That is, upon receiving a predetermined number of sample annotations with incorrect model predictions, a prior sampler is selected in the progression. For example, if a stratified sampler 506 is not correctly providing predictions, then the sampler may be changed to the hard negative sampler 504. In some implementations, the progression 500 selects a different sampler to maximize a number of "surprise" annotations or otherwise to reinforce maximizing the learning curve (e.g., maintaining a steep slope as possible on the learning curve).

Initially, the selected sampler is a seed sampler 502. The seed sampler 502 identifies samples based on input provided by a user. As described in more detail below with reference to FIGS. 13-16 the input may include keywords, phrases, and/or examples input by a user that the user is interested in classifying. Additionally, lexicons, ontologies, or other such databases for other data types may be imported to supplement and expand the inputs provided by the user. The input may also include input of a shared model assets, such as the shared model assets described above. The seed sampler 502 also allows for the user to actively search for samples within the set of training candidates as described in more detail below. In the instance of text-based annotation, the key word and phrase lists provided to the seed sampler 402 are used to initially find examples of what the user is looking for, thus providing a way to address the problem of imbalanced data (e.g., data for which there are a small number of representative samples in comparison to the number of samples in the dataset).

In some embodiments, the "seed" sampling has been completed in part via a pretrained model. This reduces the need for a user to find representative seed examples, and enables a faster progression to the hard negative sampler. In such an embodiment, the intermediate model is trained incrementally using previously discussed incremental learning rates.

The progression 500 proceeds to/from the seed sampler from/to the hard negative sampler 504. The hard negative sampler 504 uses a hard negative mining sampling algorithm to attempt to identify "surprise" annotations. That is, the hard negative mining algorithm searches for samples where the model has a prediction for an annotation with a high confidence score, but receives an annotation from a user that the annotation is incorrect (e.g., by assigning a different annotation).

The progression 500 proceeds to/from the hard negative sampler 504 from/to the stratified sampler 506. The stratified sampler 506 uses a stratified sampling algorithm. The stratified sampling algorithm identifies samples where the score for a given outcome is between two floats [A, B].

The progression 500 proceeds to/from the stratified sampler 504 from/to an uncertainty sampler 508. The uncertainty sampler 508 uses one or more of a maximum entropy algorithm, a minimum margin algorithm, a query by committee algorithm, or other such uncertainty sampling algorithm. The uncertainty sampler 508 is particularly helpful in annotating unique or infrequent or otherwise unequal probability samples in an unbalanced data set.

As noted above, the sampler may be manually selected by a user from list of pre-provided samplers, each with their own sampling algorithm. The sampling algorithms include, but are not limited to: most informative (highest entropy), minimum margin, random samples from a specific class, keyword based samples, random samples, or a linear progression through the data. Methods such as "highest entropy" can effectively identify predictions for which there is a low confidence score in order to solicit feedback.

Figure 21:
FIG. 21 illustrates an example graphical user interface depicting a dropdown illustrating multiple types of candidate sampling, in accordance with an example embodiment of the disclosed technology.

In some implementations, users are encouraged to use "automatic sampling" as shown in FIG. 21, for example. As discussed above, automatic sampling through the sampling progression 500 can maximize the information value gained in response to a new annotation received by a user. Specifically, the progression 500 may initially use key words and phrases (to find positive examples in imbalanced data), and then shift to more advanced methods. The progression 500 can adjust to one or several possible sampling methods in response to whether an annotation provided by a user come as a "surprise" (i.e., the annotation is different from the model's prediction). For example, suppose that the model has a high confidence score associated with a prediction. In the event that a human annotator agrees with the model's prediction, the progression 500 may automatically shift to samplers that provide samples for which there is more uncertainty. However, in the event that the human annotator disagrees with the model's prediction, the progression 500 may continue to show other "high confidence" samples so as to maximize the expected information gain.

In some embodiments, users can flag uncertain samples for later review in order to maintain annotation quality. In other embodiments, users can designate samples to be "memorized"—this will override a machine learned model for these samples via lookups in a hash table.

Where lists of keywords and phrases are provided or other such input is provided to seed the model, the progression 500 may ensure appropriate "coverage" of the input data. For example, given a list of ten keywords, a sampler may track the number of samples shown to a user for each keyword. In the event that a particular keyword is determined to have been "undersampled" with respect to the other keywords, the progression 500 may choose to oversample that entry until the imbalance has been corrected. This method improves the recall of the associated learned models.

If a user deems that insufficient "context" has been provided, they can request additional context. For example, if a sentence is deemed to be ambiguous, the user can request to see the sentence before and after. In this case, two annotations will recorded: that more context was needed, as well as the annotation.

A user can "hint" or otherwise manually designate areas of a training example as being most relevant. This enables, for example, aspect-based sentiment analysis. Other such user-directed sampling methods include "similar samples" and "data maps". Each of these sampling methods makes use of representations that have already been discovered using unsupervised learning techniques on the unannotated data 102 or set of training candidates. If a user requests "similar samples" for a specific sample, a sampler may use information learned via unsupervised learning techniques to attempt to find proximate examples. Similarly, upon a user performing a keyword search for a specific term or phrase, a sampler may use this information learned via unsupervised learning techniques to attempt to find examples with the keyword and its synonyms. In some embodiments, sentence vectors are calculated using continuous bag of words models, and nearby sentences are calculated using cosine distances.

Unstructured representations can also be used to reduce the data dimensionality to two or three dimensions using techniques such as t-sne or PCA. These low-dimensional representations can be presented visually a "map" by which the user can navigate his or her data, and find specific examples, as shown in FIG. 23. In one such embodiment, samples are represented as in a scatter plot, and previously annotated samples are presented with a color representing the user annotation. The "map" representation can enable the user to visually see "un-navigated territories", as well as areas where mispredictions may be occurring.

Figure 6:
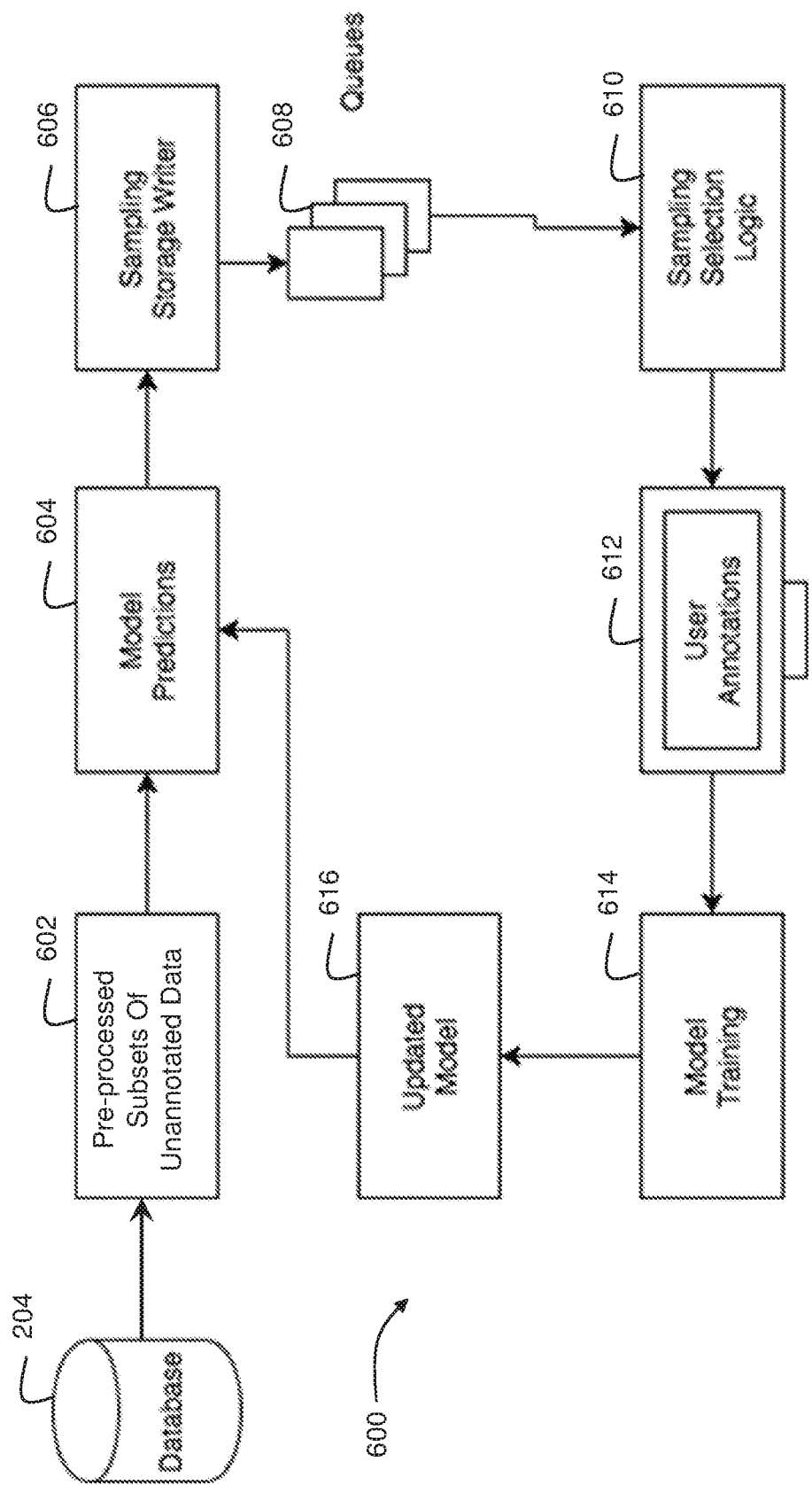
FIG. 6 is a block diagram of a computational architecture for annotating data, in accordance with an example embodiment of the disclosed technology.

FIG. 6 is a block diagram of a computational architecture 600 for annotating data, in accordance with an example embodiment of the disclosed technology. As detailed below, the computational architecture 600 provides for operating on large datasets in near real-time with limited computing resources. As discussed above in conjunction with FIGS. 3 and 4, the unannotated data 102 stored in the database 204 is pre-processed and a subset of the pre-processed data is selected for producing set of training candidates. In the computational architecture 600, the unannotated data is processed in a streaming manner. At 602, a sample is retrieved from the unannotated data 102 or the set of training candidates and pre-processed. The sample may be a randomly selected sample pulled from the unannotated data 102 or set of training candidates. The nature of the randomness can controlled via a random seed. The retrieved text is pre-processed (e.g., lowercased, spaces inserted between punctuation, and whitespace inserted for non-whitespace languages like Japanese, etc.).

At 604, the pre-processed data (e.g., text) is streamed through the model 406 that converts the pre-processed data (e.g., text) into a vector of scores (in the case of a classifier) or other such model output to produce a prediction of the prediction set. At 606, a tuple of (sample identifier, vector score) (or other prediction output by the model) are streamed through a sampling storage writer to select one or more priority queues 608 in which to write the prediction. At 610, sampling selection logic selects a priority queue from which samples and predictions are presented to a user for annotation at 612. Upon receiving the annotations from the user, the model is trained at 614 to produce an updated model 616 for continuing the process to make predictions from the pre-processed data at 604.

Were the system to store the resulting prediction for every sample, the memory and disk space requirements would be very large. For example, it is typical for the unannotated data 102 or set of training candidates may have millions or even tens or hundreds of millions of samples. The computational resources required to produce and store predictions for every sample are very large. Accordingly, the priority queues 608 each provide a limited length priority queue for each type of sampler. Each of the priority queues 608 may store only the top 10, 100, 1000, or 10000 predictions for samples according to the sampling algorithm used by the sampler. In some implementations, the priority queues 608 may store 2000 samples at a time. As discussed above, there are samplers for the various classes of interest, as well the various objective functions, each with a corresponding priority queue 608. In various implementations, there may be 2, 5, 10, 20, or more samplers. In some implementations, one or more of the samplers may not have a priority queue 608, but instead rely on a reservoir sampling algorithm. For example, in order to selectively sample from prediction vectors with a confidence level between 0.5 and 1.0 for Class A, reservoir sampling selectively samples a subset from streamed samples conforming to these requirements. The priority queues 608 can be persisted to disk on the client computer 206 or the annotation server 202. In some embodiments, the priority queues are stored using distributed database technologies, such as by being stored on the database 204. The data structure of the priority queues 608 enables only the top results to be stored, and the others to be discarded, as discussed in more detail below in conjunction with FIG. 7.

Each of the samplers and priority queues 608 belong to a single annotation process by a particular user. That is, different users may provide annotations to the same set of unannotated data, where for each user a separate set of annotations is provided. The priority queues 608 and the currently selected sampler in the progression 500 may be different for different users.

Because the priority queues 608 each maintain different sets of samples based on different sampling algorithms, the annotation process 400 can change samplers, such as at 410, with no delays evident in the processing of annotations. This outcome is specifically implemented from a design objective to reduce the user cognitive load required. The annotations can feed back into the system in order to improve the present iteration of the model, which in turn informs the samplers, and so on.

For example, given a sample, the system can make classification predictions. These predictions can be used to calculate necessary metrics such as entropy, minimum margin, and so on. These scores can be compared to the scores already stored for each type of sampler. In some embodiments, in the event that a prediction meets certain criteria, it is kept and the results are stored in one or more of the priority queues 608; otherwise, it is discarded. A net impact which is advantageous and beneficial is that the memory required for the priority queues 608 is both small and fixed with little impact on run-time. In such embodiments, a model can be retrained at a small fixed internal, at the request of the user or upon an algorithmic retraining determination, as discussed above.

In some implementations, the model can remain in a dynamic state. As new annotations arrive, the model can make small adjustments. It can then proceed to predict until it encounters a sample consistent with one of the sampler sampling algorithms. At that point, the model can "pause" awaiting further feedback from the user to annotate the sample. Once this annotation has been provided, the process can repeat.

Figure 7:
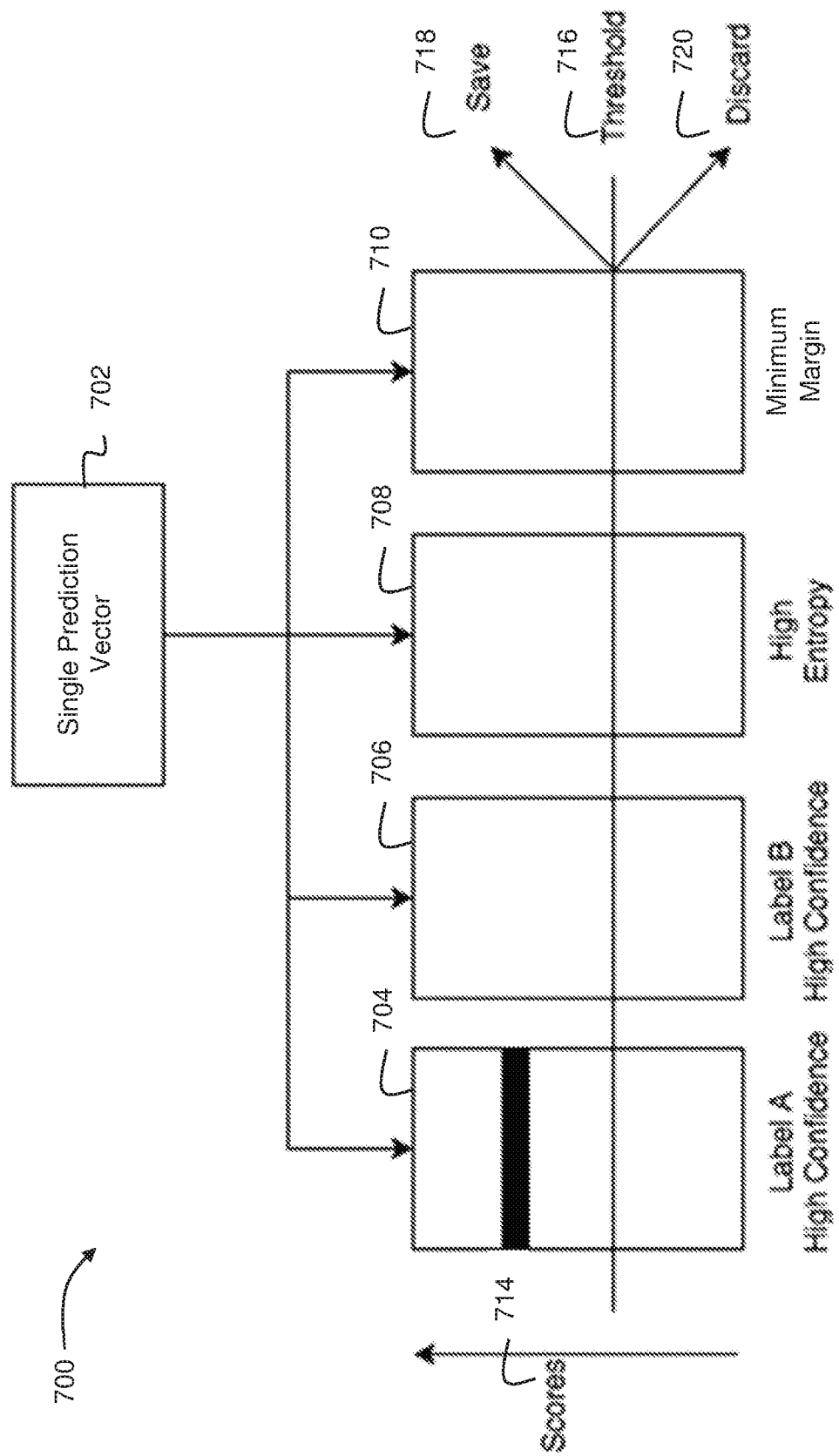
FIG. 7 is a block diagram illustrating a priority queue method employed to speed predictions and reduce hardware requirements, in accordance with an example embodiment of the disclosed technology.

FIG. 7 is a block diagram illustrating a priority queue method 700 employed to speed predictions and reduce hardware requirements, in accordance with an example embodiment of the disclosed technology. As a prediction 702 is streamed through the sampling storage writer 606, the prediction is provided to the plurality of priority queues 608. The priority queues 608 shown in the example of FIG. 7 include a priority queue 704 for samples with a high confidence prediction to be annotated with "Class A", a priority queue 706 for samples with a high confidence prediction to be annotated with "Class B", a priority queue 708 for samples with a high entropy (e.g., maintained in order of highest Shannon entropy), and a priority queue 710 for minimum margin samples. More or fewer priority queues 608 may be used. The samples are arranged in the priority queues in an order of increasing sampling score 714. As discussed above, the sampling score may be the confidence score or a value otherwise derived by the prediction vector.

As a new prediction is received, each of the priority queues 608 evaluate the sampling score for the new prediction. If the sampling score is below a threshold value 716 for a given priority queue 608, then the priority queue 608 may discard 720 the prediction. Different priority queues may use different threshold values 716. If the sampling score is above the threshold value 716 for a given priority queue 608, then the priority queue evaluates whether to save 718 the prediction. For example, if a given priority queue 608 is not full and the sampling score is greater than the threshold 716, then the priority queue 608 will save the prediction. However, if the given priority queue 608 is full, then the sampling score is compared against one or more of the sampling scores of prior saved predictions in the priority queue 608. In some embodiments, if the sampling score is not greater than any of the sampling scores of previously stored predictions, then the prediction is discarded. Otherwise, the prediction is saved in the priority queue 608 at a location in accordance with its priority score and a lowest scoring prediction is removed from the priority queue 608. As discussed above, in this way, the priority queues 608 maintain a fixed memory requirement that is substantially smaller than that required were all of the predictions saved. In other embodiments, methods such as reservoir sampling are used to maintain a subset of the original predictions, while approximating the distribution of the underlying candidate samples.

Figure 8:
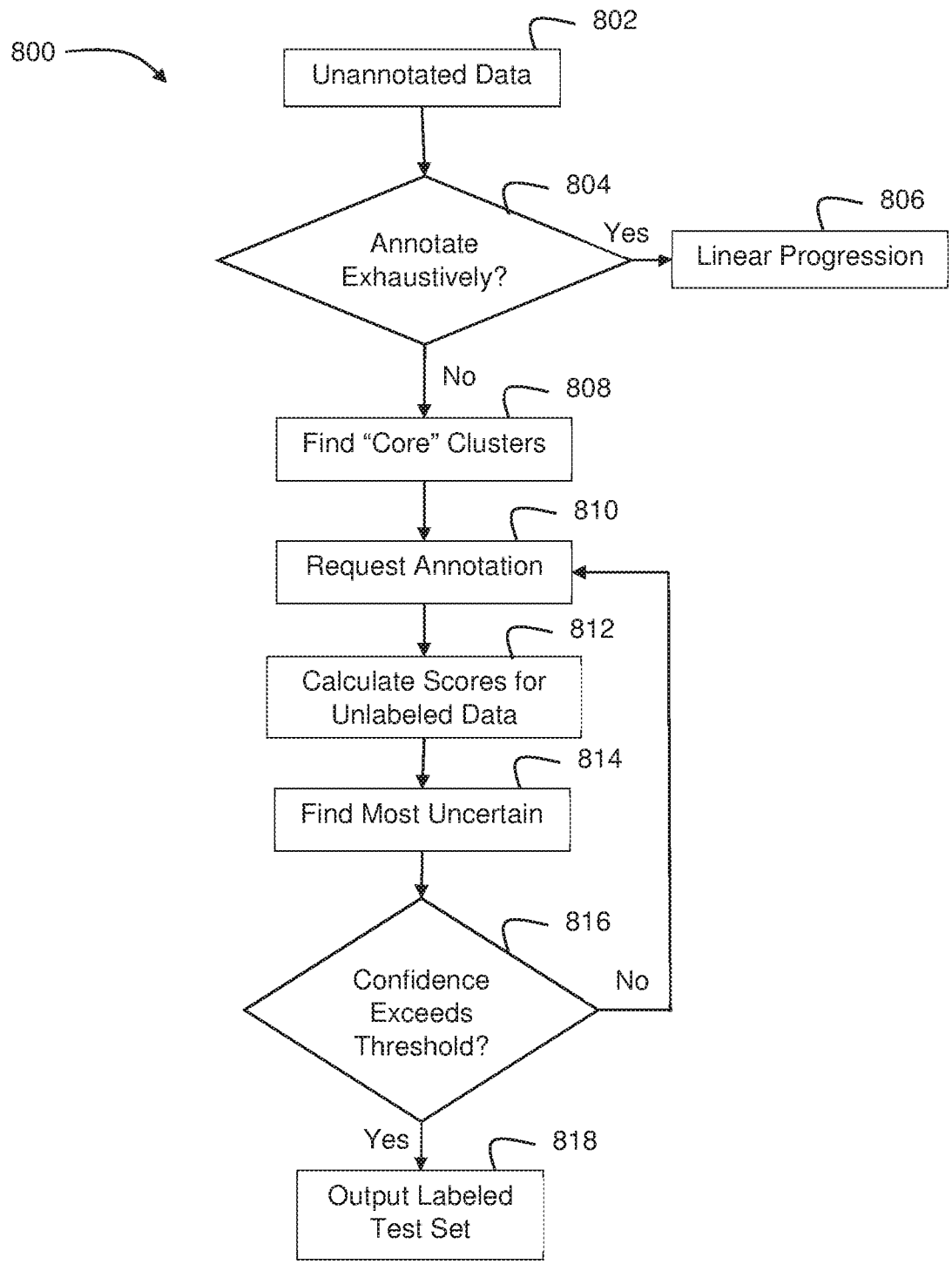
FIG. 8 is a flow diagram of an annotation process for annotating a test set of data, in accordance with an example embodiment of the disclosed technology.

FIG. 8 is a flow diagram of an annotation process 800 for annotating a test set of data, in accordance with an example embodiment of the disclosed technology. The annotation process 800 may take place during the creation of the annotated test set at 316 and be executed by the annotation server 202 or on a local install on the annotation client 206. At 802 the unannotated test set of data is received. At 804, a determination is made by the annotation process 800 or through user input for whether exhaustive annotation of the test set is desired. If yes, then at 806, the annotation process 800 provides a linear progression of the test set for annotation by a user along with an indication of progress of the linear progression, such as through a progress bar or the like.

If exhaustive annotating is not desired, then at 808, a distant supervision process is initiated through the identification of core clusters of the test set data. For example, the core clusters may be identified through various techniques associated with analysis of the underlying distribution. For example, density-based clusters with distributional modes, probability-based clusters with distributional means, or layered-based clusters with distributional centroids. Each technique is associated with a corresponding distance metric (e.g. layer-based clusters will use Euclidean distances). At 810, a request is presented through a graphical user interface to a user to annotate samples taken from one or more of the clusters. Initially, samples may be drawn randomly from clusters. As the data is annotated, clusters are assigned coherence metrics such as sum of squared distances, sample-based entropy metrics, and Gini coefficients. At 812 unannotated data points are assigned confidence scores associated with their inverse distances to annotated samples. The system alternates between exploiting points close to known samples, and exploration of new portions of the distribution. In one such embodiment, the alternation between exploration and exploitation occurs via reinforcement learning methods such as Bayesian bandits. At 816, a determination is made by the annotation process 800 of whether a confidence score of the most uncertain predictions exceeds a threshold confidence score. If not, the annotation process 800 loops back to request annotations of additional samples of the test set of data at 810. Otherwise, the test set of data is determined to be sufficiently annotated and is output at 818. In various embodiments, all techniques are run simultaneously (density-based, probability-based and layer-based), and the most successful technique is learned through reinforcement learning.

FIGS. 9-25 illustrate various example graphical user interfaces for creating the annotated training set for building a machine learning model. The graphical user interfaces of FIGS. 9-25 are displayed on a display of the annotation client 206 and inputs are received from an annotation user through an input device of the annotation client 206. The graphical user interfaces of FIGS. 9-25 may be provided to the annotation client 206 from the annotation server 202, such as through the annotation server 202 serving one or more web pages for display on a web browser on the annotation client 206. Alternatively, a local installation on the annotation client 206 may present the graphical user interfaces of FIGS. 9-25 on a display of the annotation client. Other configurations are contemplated by this disclosure.

Figure 9:
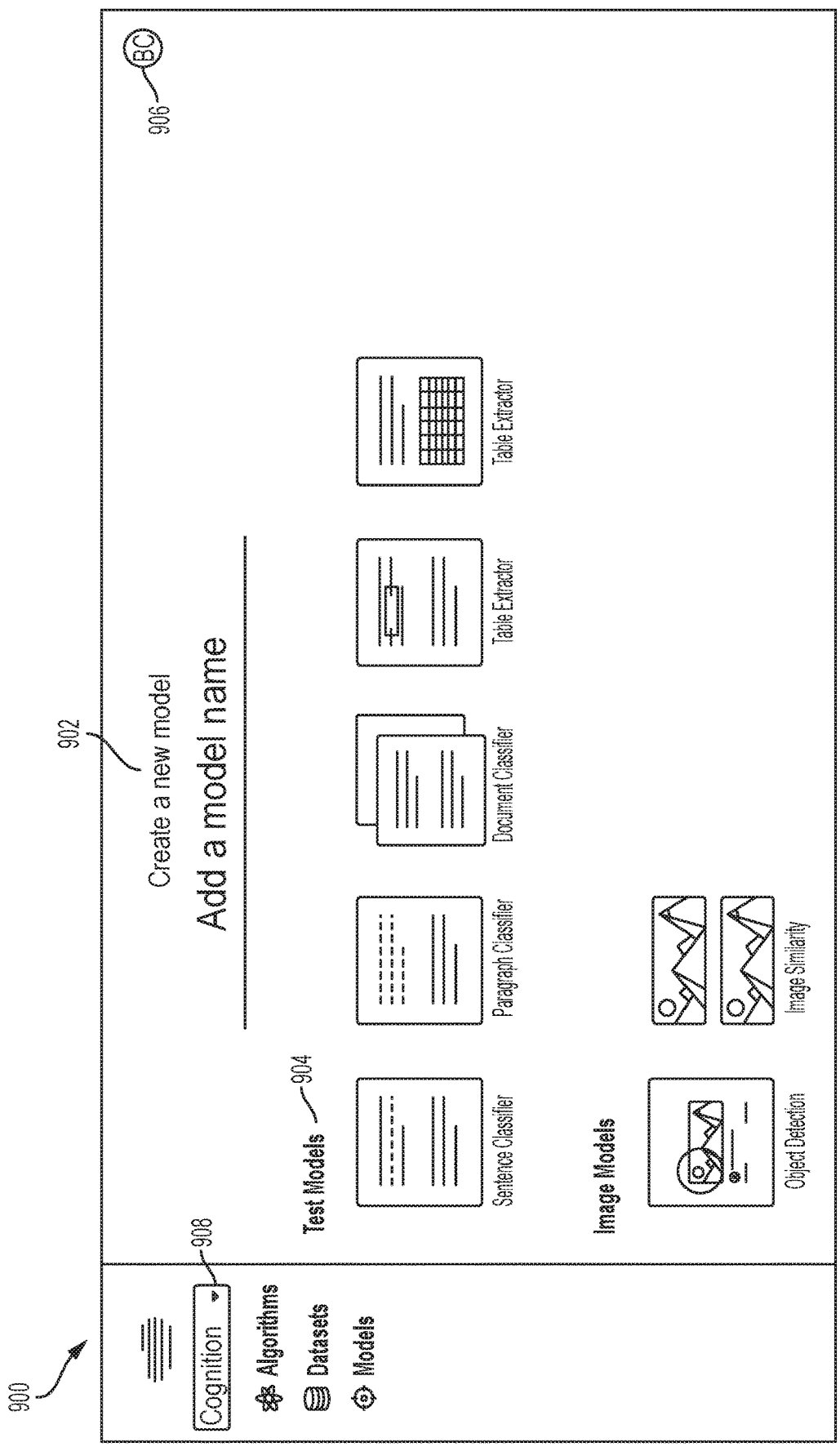
FIG. 9 illustrates an example graphical user interface for initiating creation of a new machine learning model, in accordance with an example embodiment of the disclosed technology.

FIG. 9 illustrates an example graphical user interface 900 for initiating creation of a new machine learning model, in accordance with an example embodiment of the disclosed technology. A model name field 902 is configured to receive an alphanumeric or other string naming a new model to be created. A model selection section 904 includes a plurality of selectable model buttons, each associated with a different type of classifier. For example, for text models, selectable model buttons may be provided for each of a sentence classifier, paragraph classifier, document classifier, table classifier, or table extractor. Likewise, for image models, selectable model buttons may be provided for each of an object detection model or an image similarity model. Other types of models may be used herein. The systems and processes described above are agnostic as to the type of data or model used, and for text data, agnostic to a language used in the text. A user indicator 906 may be displayed to identify a user account that is currently logged in to create the annotations. A navigation menu 908 provides selectable buttons and/or menus for navigating to other graphical user interfaces described herein. Navigation between graphical user interfaces may also be automated upon providing a desired input on a given screen. For example, upon naming a new model and selecting the type of model on the graphical user interface of FIG. 9, the graphical user interface of FIG. 10 may automatically be shown.

In various implementations, the unannotated data to be annotated is unannotated text, images, video, or audio data. The model is a one-class classifier, binary classifier, a multi-class classifier, or language classifier. The model may perform regression; information extraction; semantic role labeling; text summarization; sentence, paragraph or document classification; table extraction; machine translation; entailment and contradiction; question answering; audio tagging; audio classification; speaker diarization; language model tuning; image tagging; object detection; image segmentation; image similarity; pixel-by-pixel annotating; text recognition; or video tagging. The above lists of models and types of unannotated data are not intended to be exhaustive and are merely provided as examples. Any other type of model or type of unannotated data are contemplated by this disclosure.

FIG. 10 illustrates an example graphical user interface 1000 depicting a manner by which users can manage multiple datasets, in accordance with an example embodiment of the disclosed technology. As shown, one or more datasets of unannotated data 102 are provided in a list of selectable datasets 1002 that have been imported to the annotation server 202 or annotation client 206 or their respective databases 204, 208.

Figure 11:
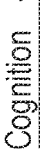
FIG. 11 illustrates an example graphical user interface depicting a manner by which users can manage multiple sets of annotations, in accordance with an example embodiment of the disclosed technology.

FIG. 11 illustrates an example graphical user interface 1100 depicting a manner by which users can manage multiple sets of annotations, in accordance with an example embodiment of the disclosed technology. Once one or more data sets have been imported, a user can create an "annotation set". The graphical user interface 1100 allows a user to manage a multiplicity of annotation sets. One or more annotation sets 104, such as annotated or unannotated sets of training candidates or sets of test data are provided in a list of selectable annotation sets 1102 that have been generated from the unannotated data 102.

Figure 12:
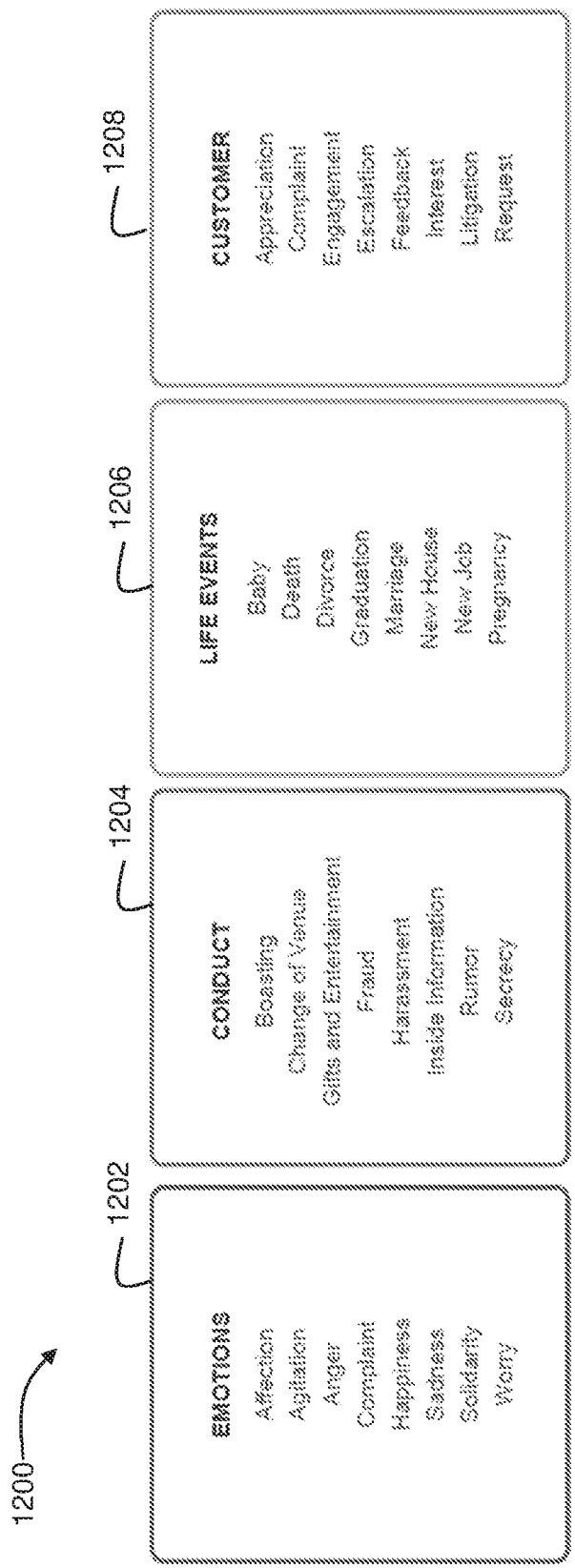
FIG. 12 illustrates an example of various sets of annotations, in accordance with an example embodiment of the disclosed technology.

FIG. 12 illustrates an example of various categories of sets of annotations, in accordance with an example embodiment of the disclosed technology. For example, the annotation sets may be categorized in an emotions category 1202, a conduct category 1204, a life events category 1206, or a customer category 1208. Other categories and types of annotation sets are contemplated by this disclosure. Within each category, a plurality of annotation sets may be listed. For example, for the emotions category 1202, a list of annotation sets includes affection, agitation, anger, complaint, happiness, sadness, solidarity, and worry. Other emotions are contemplated by this disclosure.

FIG. 13 illustrates an example graphical user interface 1300 depicting configuration options users can use to set up annotations, in accordance with an example embodiment of the disclosed technology. A selectable "edit examples" button 1302 is provided for navigating to the graphical user interface of FIG. 17 to edit examples. A selectable "edit keywords" button 1304 is provided for navigating to the graphical user interface of FIG. 14 to edit keywords. The examples and keywords of what a user is looking for in the dataset provide inputs to the seed sampler 502 described above. A selectable annotate button 1306 is provided for navigating to one of the graphical user interfaces of FIG. 18-23 to annotate samples according to one or more of the processes 300-800 described above. A selectable review button 1308 is provided for navigating to the graphical user interface of FIG. 25 to review and edit annotations.

A selectable label button 1310 facilitates adding or changing annotations for annotating samples. The selected annotations are shown in an annotation section 1312. While only two annotations are shown, other numbers of annotations may be provided for single-class or multi-class classifiers. A selectable dataset button 1314 facilitates adding additional datasets to be annotated. The datasets may be selectable from the set of datasets maintained though FIG. 10. A selectable delete icon 1316 associated with a dataset facilitates removing the dataset for annotation. In order to address issues around imbalanced data, a frequency selection 1318 facilitates a user to indicate a frequency of occurrence of the examples or keywords in the dataset. In some implementations, keywords, examples, and/or annotations may be downloaded, bought, or sold from an outside provider through, for instance, an external server. A progress indicator 1320 show a user which inputs have already been provided and which are still needed prior to initiating annotation of samples. As with the selectable annotate button 1306, a selectable annotations button 1322 is provided for navigating to one of the graphical user interfaces of FIG. 18-23 to annotate samples according to one or more of the processes 300-800 described above. Likewise, as with the selectable review button 1308, a selectable review button 1324 is provided for navigating to the graphical user interface of FIG. 25 to review and edit annotations.

Figure 14:
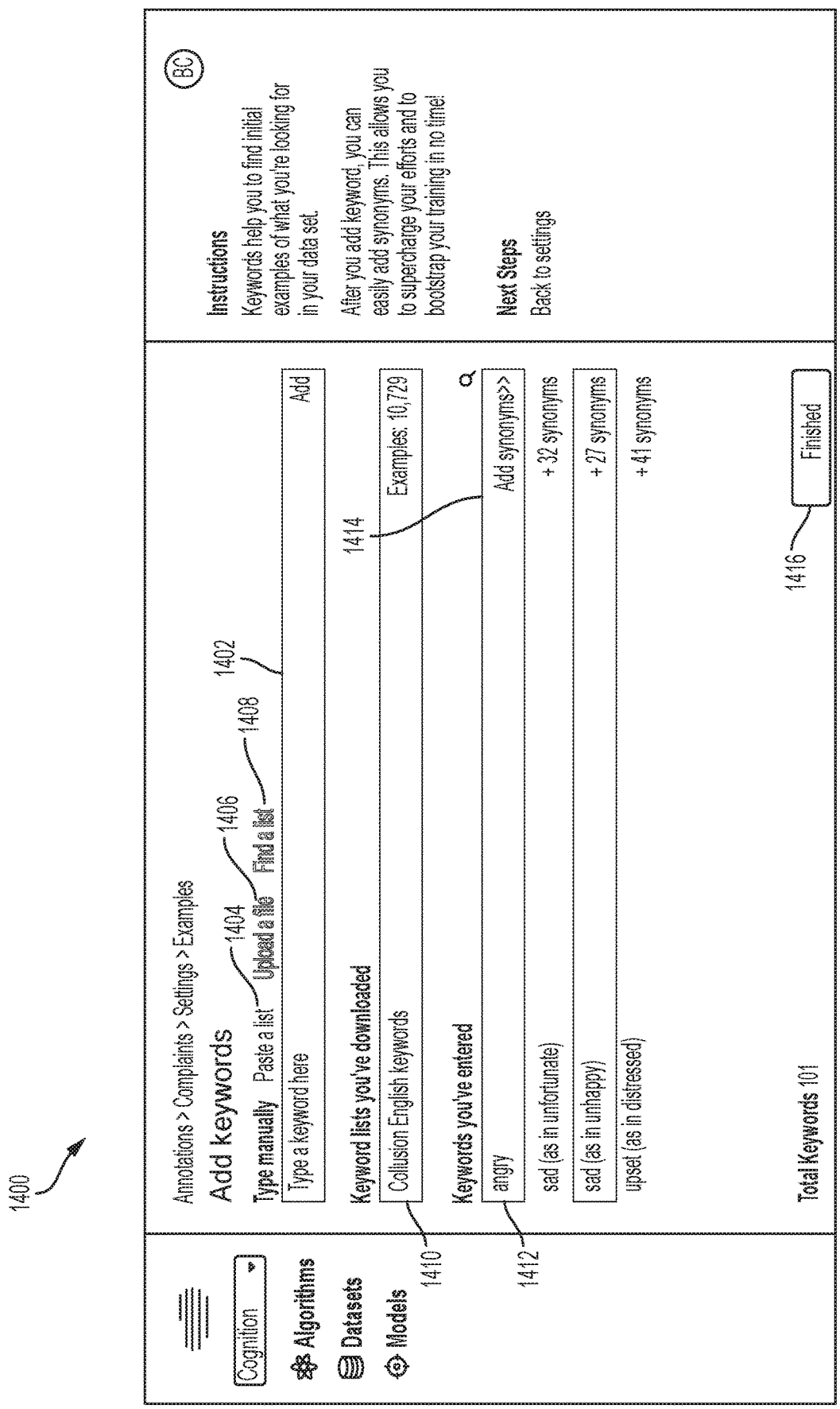
FIG. 14 illustrates an example graphical user interface depicting methods of inputting and managing lists of key words and phrases, in accordance with an example embodiment of the disclosed technology.

FIG. 14 illustrates an example graphical user interface 1400 depicting methods of inputting and managing lists of key words and phrases, in accordance with an example embodiment of the disclosed technology. A text input box 1402 is provided for adding keywords or phrases to provide to the seed sampler 502. As keywords or phrases are added, a keyword list 1412 is updated to show the list of keywords or phrases entered. A selectable button 1404 provides an option to paste a list of keywords or phrases copied from another document or program. A selectable option 1406 provides an option to upload a file of keywords or phrases for populating the keyword list. A external keyword source list 1410 is updated with uploaded keyword lists. A find a list button 1408 facilitates searching for and downloading or buying one or more keyword lists.

For each keyword or phrase shown in the keyword list 1412 a selectable synonyms button 1414 facilitates expanding the entered keyword or phrase to include synonyms. The keywords or phrases are expanded via a thesaurus lookup, via proximate word embeddings, and via external ontologies. Word embeddings refer to a set of numbers representing a word. These word embeddings can be provided in advance, or created from datasets provided by the user, or both. The word embeddings may be learned using unsupervised techniques such as skip-gram, negative sampling, or shifted positive pointwise mutual information. Ontologies refer to open-source or user provided ontologies such as dbpedia. A tree of ontology entries may be created, and given a list of keywords, a nearest common ancestor of the given list is found. The descendants of this ancestor can then be presented on a graphical user interface for selection by a user for inclusion in the keywords list 1412. In each of these cases, given a word or short phrase, similar words or phrases are provided to the user in a selectable manner to expand the keyword list 1412, such as shown in FIGS. 15 and 16. Upon completing inputting and expanding the keywords and phrases, a selectable finished button 1416 facilitates navigation back to the graphical user interface of FIG. 13.

FIG. 15 illustrates an example graphical user interface 1500 depicting a manner by which users can discover and manage related words and phrases, in accordance with an example embodiment of the disclosed technology. A keyword indicator 1502 highlights the keyword that is currently under consideration for adding synonyms or additional contexts. A list of synonyms 1504 of the keyword is provided organized into context clusters. Each cluster provides a selectable option 1506 for selecting all of the synonyms in the cluster. Additionally, each of the synonyms within each cluster is provided with a selectable option 1508 for selecting a corresponding synonym. A cancel button 1510 is selectable to discard any selected synonyms and return to the graphical user interface of FIG. 14. Otherwise, an acceptance button 1512 saves the selected synonyms in the keyword list 1412 and navigates back to the graphical user interface of FIG. 14.

FIG. 16 illustrates an example graphical user interface 1600 depicting an incorporation of ontologies into word list management, in accordance with an example embodiment of the disclosed technology. The text input box 1402 is provided for adding keywords or phrases to the keyword list 1412. As keywords or phrases are added to the keyword list 1412, one or more ontologies are consulted to provide a list of selectable keywords 1602 to add to the keyword list 1412. As discussed above, a tree of ontology entries may be created, and given the keyword list keywords, a nearest common ancestor of the given list is found. The descendants of this ancestor can then be presented on the graphical user interface 1600 as the selectable keywords 1602 for selection by a user for inclusion in the keywords list 1412.

FIG. 17 illustrates an example graphical user interface 1700 depicting methods of inputting and managing lists of examples, in accordance with an example embodiment of the disclosed technology. The graphical user interface 1700 may be navigated to by selecting the edit examples button 1302 on the graphical user interface 1300. Similar to the keywords or phrases, the examples graphical user interface 1700 includes a text entry box 1702 for adding a new example. As shown, the examples provide keywords in context through one or more sentences. Each example is selectable to assign an annotation to the example. For example, an annotation menu 1704 is presented for indicating whether or not the example is an example of a particular class or other piece of data that the user is looking for in the dataset. A list 1706 of previously entered examples and corresponding annotations is shown. A finished button 1708 is selectable to navigate back to the graphical user interface 1300.

Various aspects of the graphical user interfaces that facilitate the annotation processes described are described in further detail below. The graphical user interfaces of FIGS. 18-24 provide information that facilitates human judgment around model quality. Once the user has annotated a number of examples, an initial model can be trained and additional sampling methods become available.

Figure 18:
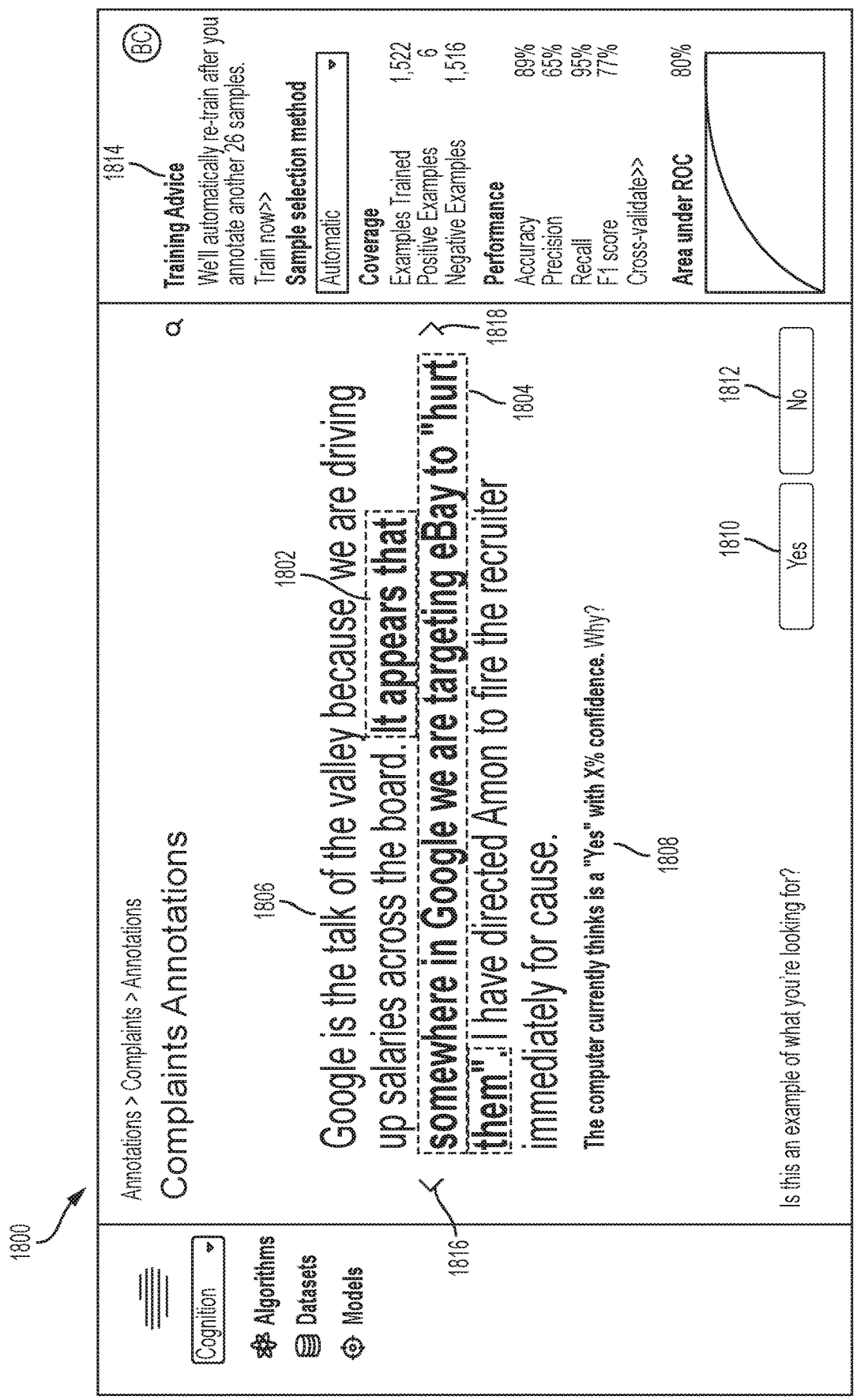
FIG. 18 illustrates an example graphical user interface depicting an annotation process, tools to manage the annotation process, and feedback around progress, in accordance with an example embodiment of the disclosed technology.

FIG. 18 illustrates an example graphical user interface 1800 depicting an annotation process, tools to manage the annotation process, and feedback around progress, in accordance with an example embodiment of the disclosed technology. The graphical user interface 1800 provides for minimizing the cognitive load and expertise required to train a machine learning model. This can be achieved through displaying a series of examples derived from the dataset provided by the user. The examples are selected by sampler, as described above, that can minimize the number of annotations required by the user to create a strong model.

The example 1802 may be provided to the graphical user interface. A highlight 1804 of words or phrases found to be interesting is provided, where the highlights and colors may represent the direction and magnitude of the impact made on the final prediction. Surrounding context 1806 may also be provided with the example, such as a prior and following sentence. Additionally, a prediction 1808 is shown to the user along with a confidence score of that prediction. A data annotation can be stored in an answer to a question such as by selecting either a "Yes" 1810 or "No" 1812 button. Users can optionally provide their responses via keyboard shortcuts, such as typing "Y" or "N".

Feedback 1814 is provided to the user on the quality and quantity of data annotated. For example, feedback on the coverage of annotations may include a number of examples trained including a breakdown of a number of positive and a number of negative examples trained. Additionally, performance metrics of the model may also be shown, such as the accuracy, precision, recall, F1 score, or area under ROC for binary classifiers. Other metrics may be shown. One or more navigation icons may be provided to skip annotation of an example, such as by selection of an arrow 1818, or to return to a prior example, such as by selection of an arrow 1816.

FIG. 19 illustrates an example graphical user interface 1900 depicting an annotation process that permits users to score the strength of their responses, in accordance with an example embodiment of the disclosed technology. Additionally or alternatively to providing "Yes" or "No" inputs for annotations, a user may score how good an example is, such as though selecting one of a plurality of score buttons 1902 on a scale (e.g., "1" through "5" buttons). Additional feedback may also be provided of the type of sampler 1904 that is currently being used to select examples for annotation.

Figure 20:
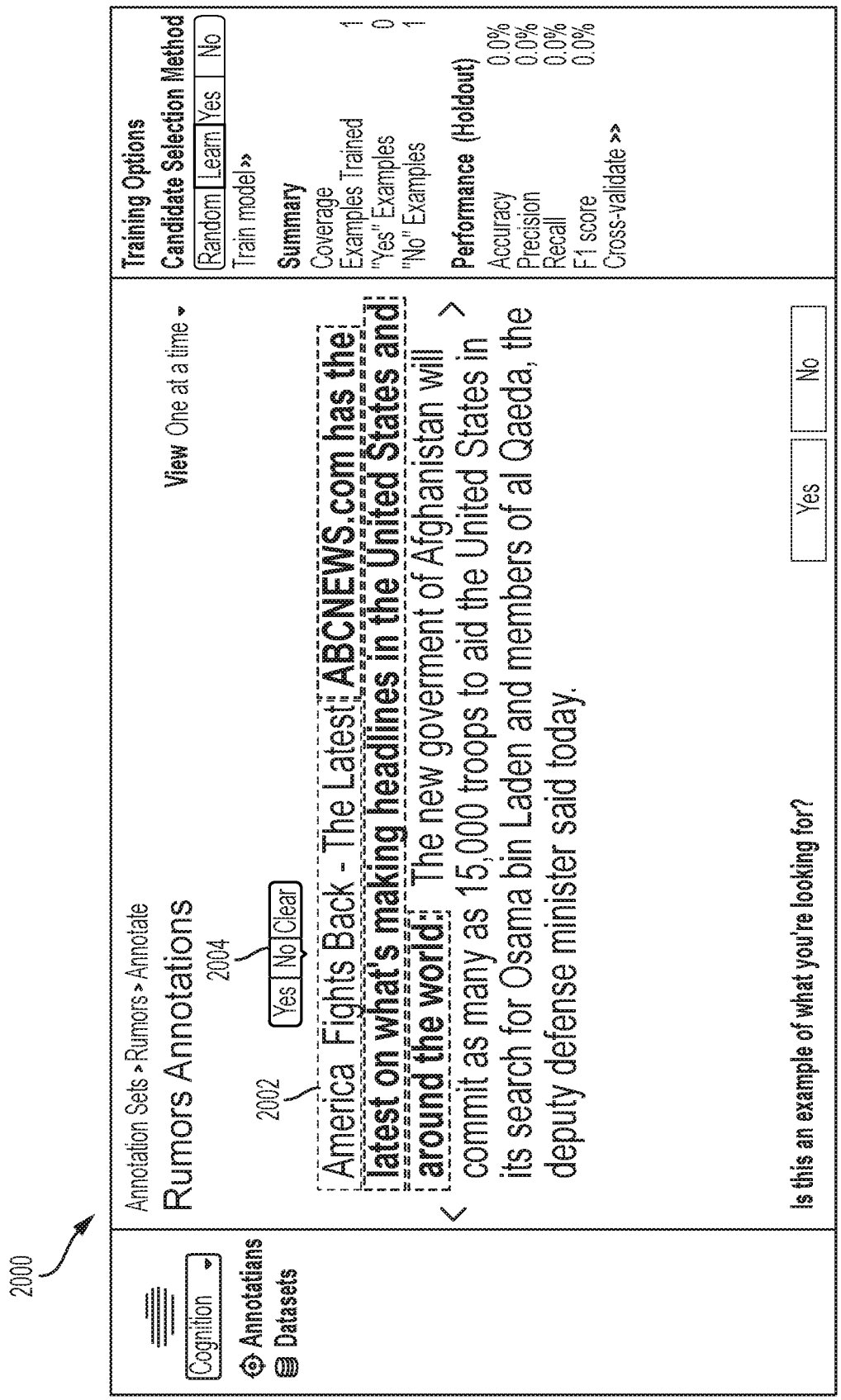
FIG. 20 illustrates an example graphical user interface depicting the ability to annotate adjacent entries, as well as colored feedback on annotations, in accordance with an example embodiment of the disclosed technology.

FIG. 20 illustrates an example graphical user interface 2000 depicting the ability to annotate adjacent entries, as well as colored feedback on annotations, in accordance with an example embodiment of the disclosed technology. For example, upon being presented an example, a user may highlight 2002 an adjacent entry and provide a selection from a menu 2004 to annotate the adjacent entry as a positive example, a negative example, or clear the highlight of the adjacent entry, for example.

FIG. 21 illustrates an example graphical user interface 2100 depicting a dropdown illustrating multiple types of candidate sampling, in accordance with an example embodiment of the disclosed technology. As discussed above, the sampler may be manually selected through user input. In the example shown in FIG. 21, a sampling method menu 2102 is provided for selecting from different types of samplers for providing examples. A currently selected sampler is indicated through a selection highlight 2104. Samplers available selection are indicted by a selection icon 2106. For example, upon selecting the selection icon 2106, the sampler may be changed from the automatic sampler (e.g., progression 500) to an error reducing sampler. Other types of sampling method menus may be used, such as a drop-down list, for example. Through the use of the priority queues 608 described above, despite changing the sampling algorithm for providing examples to the graphical user interface, the user will not notice a processing lag in obtaining a subsequent example.

Figure 22:
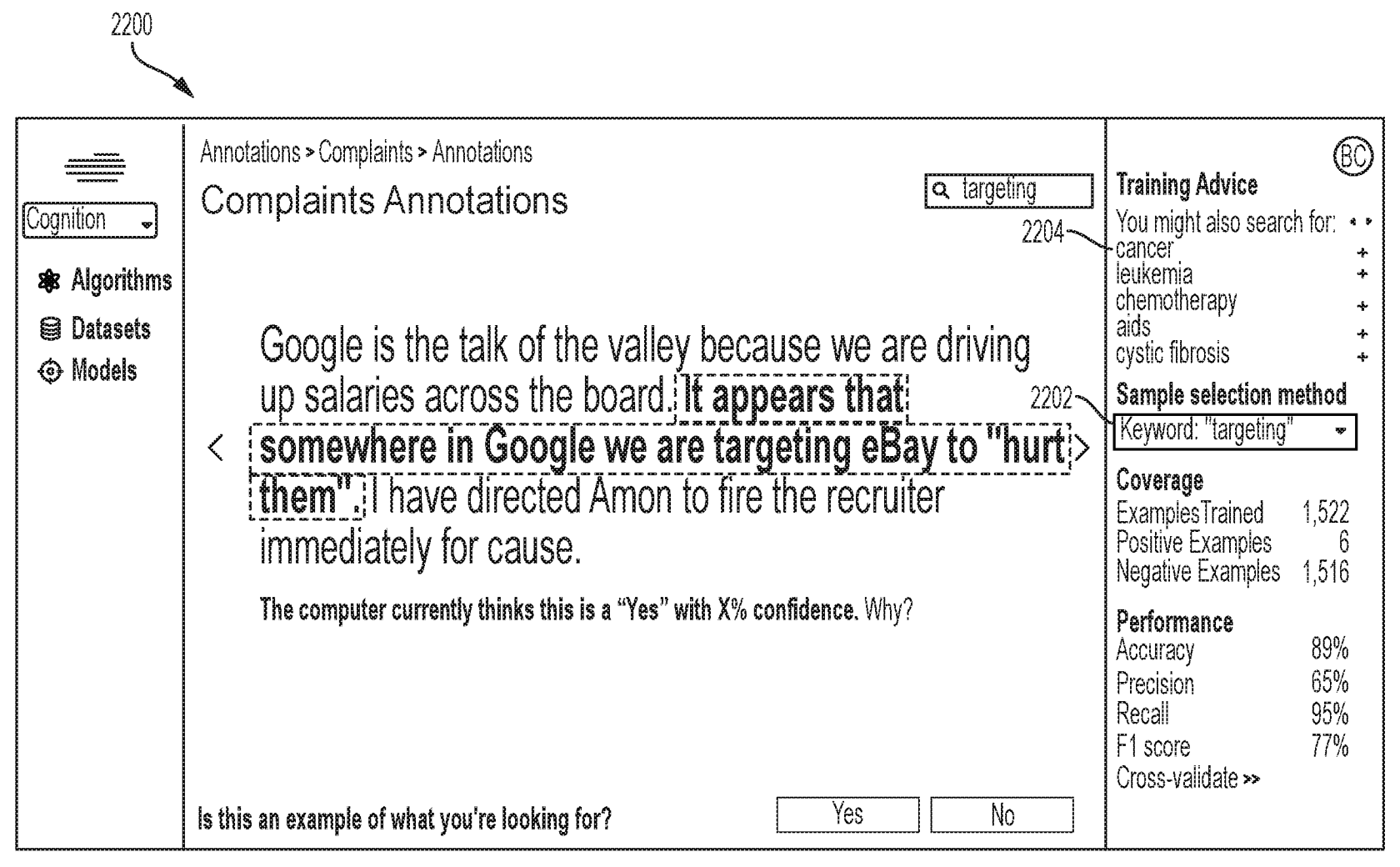

FIG. 22 illustrates an example graphical user interface 2200 depicting a one-time keyword search across data, in accordance with an example embodiment of the disclosed technology. Additionally, as discussed above, the seed sampler 502 may use inputs provided by the user to search for additional examples. For example, a user may enter a keyword into a search box 2202 to search within the dataset to identify additional examples. In response to a user searching for a keyword in the search box 2202, the user interface 2200 may present additional selectable keywords or phrases 2204 for expanding on the user's search. For example, the additional keywords or phrases may be generated using a thesaurus, lexicon, and/or ontology, as described above. Upon selection of one of the selectable keywords or phrases 2204 an additional search using the selected keyword or phrase may be performed.

Figure 23:
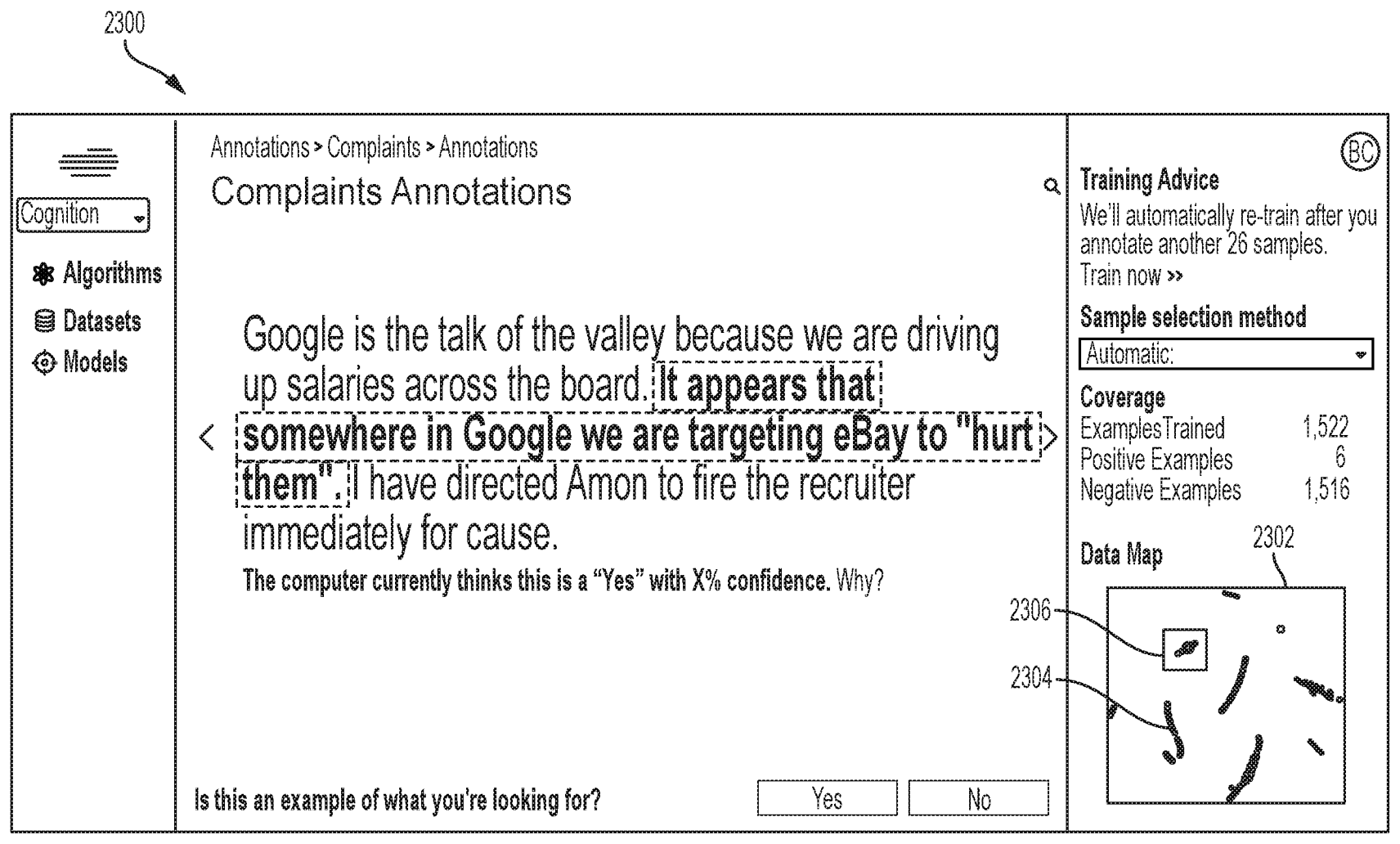

FIG. 23 illustrates an example graphical user interface 2300 depicting a data map that can allow users to explore their data visually, in accordance with an example embodiment of the disclosed technology. As noted above, unstructured representations of the dataset can be used to reduce the data dimensionality to two or three dimensions using techniques such as t-sne or PCA. These low-dimensional representations can then be shown on the graphical user interface 2300 as a data map 2302. The data map 2302 may include data indicators 2304, representative of samples in identified clusters or other groupings of data. Each sample may have a color representative of the sample's annotation or indicative of whether the sample has not been annotated. Additionally, a confidence score of samples may be represented graphically by a size of an icon representative of a given sample (e.g., diameter of a circle is different based on confidence score). Disagreement amongst annotators/errors may additionally be indicated on the data map 2302 through an error icon (e.g., red color or distinctive shape or pattern indicative of errors). The user can navigate their data with the data map 2302, and find and select specific examples 2306 for annotation. For example, the user may draw a bounding box or lasso around samples for which they would like to provide annotations. As discussed above, the seed sampler 502 may use this input provided by the user to present additional examples. For example, the user may select to annotate an identified cluster of samples that have not yet been annotated. Alternatively, the user may select to annotate a cluster of samples with several colors associated with the samples, representative of multiple different annotations being used to annotate the data elements in the cluster. Therefore, the user may clarify desired annotations or otherwise provide further input to facilitate correct annotating of the selected data.

Figure 24:
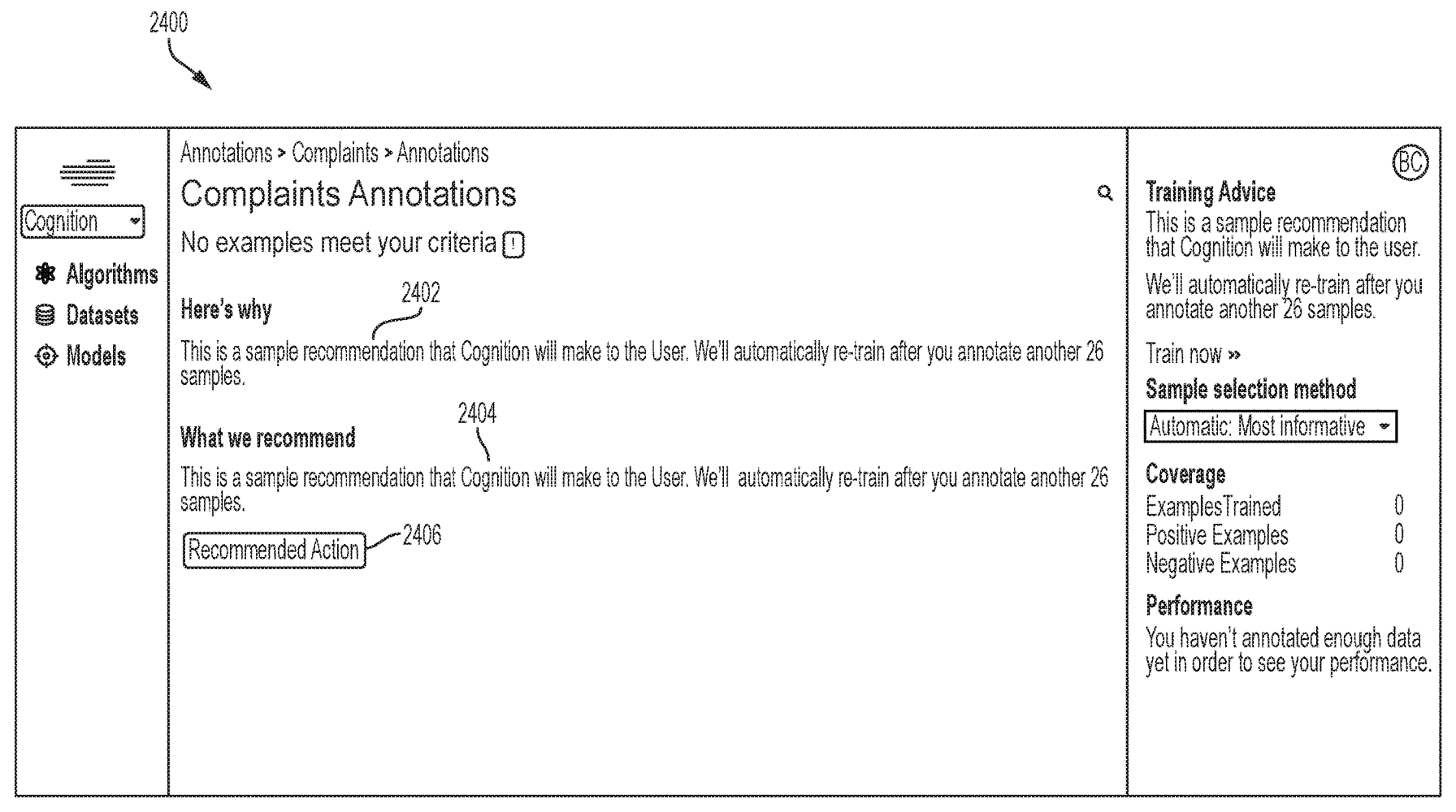

FIG. 24 illustrates an example graphical user interface 2400 depicting how fail states can be handled and information is conveyed back to the user, in accordance with an example embodiment of the disclosed technology. For example, feedback 2402 may be provided for why the fail state has been shown as well as provide a recommendation 2404 for how to resolve the fail state. A recommended action button 2406 may be provided for automatically initiating the recommendation 2404.

FIG. 25 illustrates an example graphical user interface 2500 depicting a list of previously annotated entries and how those entries are managed, in accordance with an example embodiment of the disclosed technology. For example, the user interface 2500 may be navigated to upon selection of the review buttons 1308, 1324 to review the annotations. In performing a review of the annotations, the user may select any of the annotations to change an annotation associated with the annotation. For example, upon selecting an annotation, an annotation menu 2502 may be presented with options for selecting a different annotation.

Figure 26:
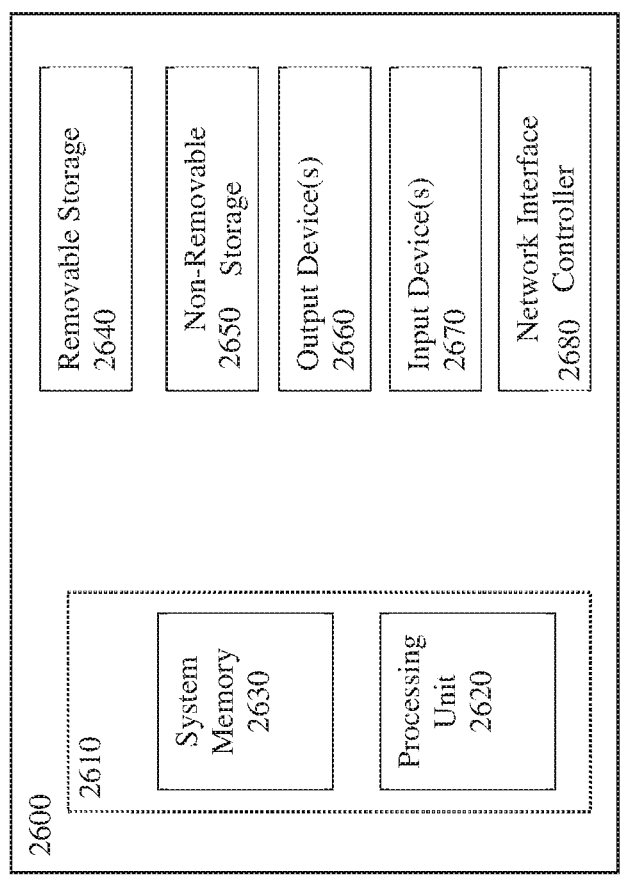
FIG. 26 illustrates an exemplary computer system, in accordance with an example embodiment of the disclosed technology.

FIG. 26 illustrates an exemplary computer system, in accordance with an example embodiment of the disclosed technology.

Certain aspects of the disclosed technology are described herein with respect to systems and methods, and/or applications, programs, or other computer-related implementations and configurations. A "system" as described herein can refer to computer-related systems and components, which may utilize single computer or distributed computing architectures. The illustrations of the various Figures showing aspects of graphical user interfaces, and as described herein, refer to displayed data, as well as functional interactive elements and outputs, which may be controlled by the input and output controller and/or other systems of one or more computing systems. The one or more computing systems can comprise functional components for implementing the various systems, methods, and/or applications/programs mentioned herein, for example one or more computers that include one or more processors coupled to one or more memory devices and/or other storage devices for storing instructions, that, when executed by the one or more processors, cause the computer(s) to perform specific tasks for implementing the various aspects of the described embodiments of the disclosed technology.

Such components of the computer(s) may be coupled, as briefly mentioned above, to input/output controllers for receiving input from input devices, for example interactive input from a user of a computer viewing the graphical user interface displays, and for controlling the output of data to one or more display devices or other output peripheral devices. "Methods" as referred to herein can be computer-implemented methods comprising series of operations executed by one or more processors and/or other computer system components. References herein to applications, programs, or the like can be computer-executable instructions, which may be stored in modules, on hard disks, and/or removable storage medium (aka "computer-readable medium" or "computer-readable storage medium" or "non-transitory computer-readable storage medium"), and which instructions, when executed by one or more processors, cause one or more computer systems to perform specific functions in relation to the embodiments described herein. The components of various computers and/or systems described herein can include network interface components for accessing network connections to networks such as the internet, or internal networks, to receive and transmit data over such networks, for example by exchanging data with one or more external servers.

It should be appreciated that the logical operations described herein with respect to the various figures may be implemented (1) as a sequence of computer implemented acts or program modules (i.e., software) running on a computing device (e.g., the computing device described in FIG. 26), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Referring to FIG. 26, an example computing device 2600 upon which embodiments of the invention may be implemented is illustrated. For example, each of the annotation server 202 or the client computer 206 described herein may each be implemented as a computing device, such as computing device 2600. It should be understood that the example computing device 2600 is only one example of a suitable computing environment upon which embodiments of the invention may be implemented. Optionally, the computing device 2600 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In an embodiment, the computing device 2600 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device 2600 to provide the functionality of a number of servers that is not directly bound to the number of computers in the computing device 2600. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In its most basic configuration, computing device 2600 typically includes at least one processing unit 2620 and system memory 2630. Depending on the exact configuration and type of computing device, system memory 2630 may be volatile (such as random access memory (RAM)), non-volatile (such as read-only memory (ROM), flash memory, etc.), or some combination of the two. This most basic configuration is illustrated in FIG. 26 by dashed line 2610. The processing unit 2620 may be a standard programmable processor that performs arithmetic and logic operations necessary for operation of the computing device 2600. While only one processing unit 2620 is shown, multiple processors may be present. Thus, while instructions may be discussed as executed by a processor, the instructions may be executed simultaneously, serially, or otherwise executed by one or multiple processors. The computing device 2600 may also include a bus or other communication mechanism for communicating information among various components of the computing device 2600.

Computing device 2600 may have additional features/functionality. For example, computing device 2600 may include additional storage such as removable storage 2640 and non-removable storage 2650 including, but not limited to, magnetic or optical disks or tapes. Computing device 2600 may also contain network connection(s) 2680 that allow the device to communicate with other devices such as over the communication pathways described herein. The network connection(s) 2680 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 2600 may also have input device(s) 2670 such as a keyboards, keypads, switches, dials, mice, track balls, touch screens, voice recognizers, card readers, paper tape readers, or other well-known input devices. Output device(s) 2660 such as a printers, video monitors, liquid crystal displays (LCDs), touch screen displays, displays, speakers, etc. may also be included. The additional devices may be connected to the bus in order to facilitate communication of data among the components of the computing device 2600. All these devices are well known in the art and need not be discussed at length here.

The processing unit 2620 may be configured to execute program code encoded in tangible, computer-readable media. Tangible, computer-readable media refers to any media that is capable of providing data that causes the computing device 2600 (i.e., a machine) to operate in a particular fashion. Various computer-readable media may be utilized to provide instructions to the processing unit 2620 for execution. Example tangible, computer-readable media may include, but is not limited to, volatile media, non-volatile media, removable media and non-removable media implemented in any method or technology for storage of information such as computer readable instructions, data structures, program modules or other data. System memory 2630, removable storage 2640, and non-removable storage 2650 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 2620 may execute program code stored in the system memory 2630. For example, the bus may carry data to the system memory 2630, from which the processing unit 2620 receives and executes instructions. The data received by the system memory 2630 may optionally be stored on the removable storage 2640 or the non-removable storage 2650 before or after execution by the processing unit 2620.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Use of the phrase "and/or" indicates that any one or any combination of a list of options can be used. For example, "A, B, and/or C" means "A", or "B", or "C", or "A and B", or "A and C", or "B and C", or "A and B and C". As used in the specification, the singular forms "a," "an" and "the" include plural referents unless the context clearly dictates otherwise. Moreover, titles or subtitles may be used in this specification for the convenience of a reader, which shall have no influence on the scope of the disclosed technology. By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose.

It is to be understood that the mention of one or more steps of a method does not preclude the presence of additional method steps or intervening method steps between those steps expressly identified. Steps of a method may be performed in a different order than those described herein. Similarly, it is also to be understood that the mention of one or more components in a device or system does not preclude the presence of additional components or intervening components between those components expressly identified.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of managing lifecycle of machine learning models, the method comprising:
  receiving a set of unannotated data comprising a plurality of samples;
  generating a prediction set, wherein the prediction set comprises the plurality of samples and respective annotations for each of the plurality of samples;
  evaluating the prediction set to determine whether to request user annotations, wherein the evaluation comprises assessing a confidence associated with the prediction set;
  in response to the evaluation, selecting a plurality of first samples from the prediction set based on an automated sampler selection, wherein the automated sampler selection is from one of a plurality of samplers in a progression;
  requesting user annotations of the plurality of first samples;
  adjusting the progression of the automated sampler selection in response to receiving at least one user annotation, wherein the adjustment modifies a sequence of the plurality of samplers in the progression;
  providing an annotated first set of data, wherein the annotated first set of data comprises one or more of the plurality of samples and respective annotations and one or more of the plurality of first samples and user annotations;
  training a first machine learning model based on the annotated first set of data;
  deploying the first machine learning model to a client system, wherein production annotations are generated;
  collecting the generated production annotations;
  incorporating the production annotations into the annotated first set of data, thereby forming an annotated second set of data;
  training a second machine learning model on the annotated second set of data;
  comparing the quality of the first machine learning model and the second machine learning model;
  selecting the first machine learning model or the second machine learning model; and
  deploying the selected machine learning model to the client system.

2. The method of claim 1, further comprising:
  determining one or more measures of quality of the first machine learning model or the second machine learning model including precision, recall, average precision, receiver operator characteristic scores, or F-beta scores.

3. The method of claim 1, further comprising:
  sharing the selected machine learning model with a third party.

4. The method of claim 1, further comprising selecting the plurality of first samples from the prediction set based on user input, wherein the user input comprises one or more of a semantic search, a selection of a similar sample, or a selection on a visual map of the set of unannotated data.

5. The method of claim 1, wherein each of the plurality of samplers uses a different sampling algorithm.

6. The method of claim 5, wherein the different sampling algorithm is selected from a density sampling algorithm; entropy sampling algorithm; estimated error reduction sampling algorithm; exhaustive sampling algorithm; flagged predictions algorithm;
  hard negative mining sampling algorithm; high confidence sampling algorithm; linear sampling algorithm; map visualization sampling algorithm; metadata search sampling algorithm; minimum margin sampling algorithm; query by committee sampling algorithm; random sampling algorithm; review sampling algorithm; search sampling algorithm; similarity sampling algorithm; sampling of samples for which the input was to skip the sample type algorithm;
  stratified sampling algorithm; most confident samples algorithm; or most uncertain samples algorithm.

7. The method of claim 5, wherein the progression comprises successively changing between samplers of the plurality of samplers, and wherein each sampler of the plurality of samplers has an expected distribution of outcomes that determine whether to move to a previous or next sampler in the progression.

8. The method of claim 7, wherein:
  upon receiving a predetermined number of sample annotations with incorrect model predictions, the progression changes between samplers to a previous sampler in the progression; and
  upon receiving a predetermined number of sample annotations with consistent model predictions, the progression changes between samplers to a next sampler in the progression.

9. The method of claim 1, wherein training the first machine learning model comprises receiving a shared model and initializing weights of an intermediate model to weights of the shared model and trained with different learning rates.

10. The method of claim 1, further comprising requesting exhaustive annotations of a test set of data, and wherein the exhaustive annotations of the test set of data is performed by distant supervision comprising one or more of density sampling, level set trees, or random sampling.

11. The method of claim 1, further comprising presenting a recommendation on a graphical user interface of a sampler from the plurality of samplers for selecting the plurality of first samples from the prediction set; and
  presenting data quality and quantity metrics on the graphical user interface.

12. The method of claim 11, wherein the data quantity metrics comprise one or more of a number of samples trained, a number of positive examples, a number of negative examples, or a number of samples trained for a class of samples.

13. The method of claim 11, wherein the data quality metrics comprise one or more of an accuracy, precision, recall, or F1 score.

14. The method of claim 1, further comprising presenting, on a graphical user interface, inconsistencies across annotations of the prediction set.

15. The method of claim 1, wherein training the first machine learning model and/or training the second machine learning model comprises selecting an algorithm and loss function to establish the machine learning model.

16. The method of claim 15, wherein selecting the algorithm is based on a model type.

17. The method of claim 1, further comprising:
testing convergence by training the first machine learning model multiple times on a set of annotated training data that is annotated from the set of unannotated data and measuring a dispersion of quality metrics across runs.

18. The method of claim 17, wherein the quality metrics include a slope of a learning curve.

19. The method of claim 1, wherein the first machine learning model and/or the second machine learning model is trained using default hyperparameters selected for a given model type and algorithm.

20. The method of claim 19, wherein hyperparameters are selected using one or more of random selection, grid search, or Bayesian estimation methods.

21. The method of claim 19, wherein one or more of random seeds, algorithm selection, loss function, hyperparameters, dataset splits, dataset hashes, or class weights are stored for the first machine learning model and/or the second machine learning model.

22. The method of claim 1, where the selected machine learning model is versioned, changed over, or rolled back.

23. The method of claim 1, further comprising:
monitoring for changes between the first machine learning model and the second machine learning model via data drift or concept drift,
wherein concept drift is calculated by training models based on quantifying a number of changed predictions between the annotated first set of data and the production annotations, and
wherein data drift is measured based on corpus statistics and/or corpus comparisons between the annotated first set of data and the production annotations.

24. The method of claim 23, wherein an alert is generated upon identifying data drift or concept drift.

25. The method of claim 24, wherein the data drift or concept drift comprises metrics on unannotated data over time or metrics on predicted annotations over time.

26. The method of claim 3, wherein sharing the selected machine learning model comprises performing one or more of feature hashing, cryptographic hashing, or random projections.

27. The method of claim 3, wherein sharing the selected machine learning model comprises sharing a gradient update of the selected machine learning model and the gradient update is added to a layer in a computational graph.

28. The method of claim 3, wherein sharing the selected machine learning model comprises sharing one or more model assets, and wherein the one or more model assets comprises word embeddings trained on datasets, word vectors, sets of annotations, lists of keywords and phrases, lists of examples, language models, lexicons, as well as trained models, and model architectures.

29. The method of claim 28, wherein the one or more model assets is sanitized of personally identifiable information.

30. The method of claim 1, wherein the progression comprises progressing from a seed sampler to a hard negative sampler to a stratified sampler, to an uncertainty sampler.

31. The method of claim 1, wherein requesting user annotations of the plurality of first samples comprises presenting questions to a user on a graphical user interface for annotation feedback.

32. The method of claim 1, further comprising predicting the respective annotations for each of the plurality of samples of the set of unannotated data.

33. The method of claim 32, wherein the predicting of the respective annotations is prior to requesting user annotations of the plurality of first samples.

34. The method of claim 32, further comprising storing the predicted respective annotations in a priority queue based on a sampling score.

35. The method of claim 34, wherein the sampling score is a confidence score of the predicted respective annotations.

36. The method of claim 34, further comprising:
prior to storing the predicted respective annotations in the priority queue, determining whether the sampling score is greater than a threshold sampling score; and
discarding a prediction having a sampling score that is determined to be less than the threshold sampling score.

37. The method of claim 34, wherein the priority queue stores a predetermined maximum number of predictions, and wherein the method further comprises:
determining that a number of predictions stored in the priority queue is less than the predetermined maximum number of predictions prior to storing the prediction in the priority queue.

38. The method of claim 34, further comprising determining that the sampling score is greater than at least one previously stored prediction in the priority queue prior to storing the prediction in the priority queue.

39. The method of claim 34, further comprising discarding a previously stored prediction in the priority queue having a lowest sampling score.

40. The method of claim 34, wherein requesting user annotations of the plurality of first samples comprises selecting the priority queue from among a plurality of priority queues.

41. A system for managing lifecycle of machine learning models, comprising:
a processor; and
a non-transitory memory device coupled to the processor and storing computer-readable instructions which, when executed by the processor, cause the system to perform functions that comprise:
receiving a set of unannotated data comprising a plurality of samples;
generating a prediction set, wherein the prediction set comprises the plurality of samples and respective annotations for each of the plurality of samples;
evaluating the prediction set to determine whether to request user annotations, wherein the evaluation comprises assessing a confidence associated with the prediction set;
in response to the evaluation, selecting a plurality of first samples from the prediction set based on an automated sampler selection, wherein the automated sampler selection is from one of a plurality of samplers in a progression;
requesting user annotations of the plurality of first samples;
adjusting the progression of the automated sampler selection in response to receiving at least one user annotation, wherein the adjustment modifies a sequence of the plurality of samplers in the progression;

providing an annotated first set of data, wherein the annotated first set of data comprises one or more of the plurality of samples and respective annotations and one or more of the plurality of first samples and user annotations;

training a first machine learning model based on the annotated first set of data;

deploying the first machine learning model to a client system, wherein production annotations are generated;

collecting the generated production annotations;

incorporating the production annotations into the annotated first set of data, thereby forming an annotated second set of data;

training a second machine learning model on the annotated second set of data;

comparing the quality of the first machine learning model and the second machine learning model;

selecting the first machine learning model or the second machine learning model; and deploying the selected machine learning model to the client system.

42. The system of claim 41, wherein the functions performed by the system further comprise:

determining one or more measures of quality of the first machine learning model or the second machine learning model including precision, recall, average precision, receiver operator characteristic scores, or F-beta scores.

43. The system of claim 41, wherein the functions performed by the system further comprise:

sharing the selected machine learning model with a third party.

44. The system of claim 41, wherein the functions performed by the system further comprise presenting data quality and quantity metrics on a graphical user interface.

45. The system of claim 41, wherein the functions performed by the system further comprise presenting, on a graphical user interface, inconsistencies across annotations of the prediction set.

46. The system of claim 41, wherein the functions performed by the system further comprise:

testing convergence by training the first machine learning model multiple times on a set of annotated training data that is annotated from the set of unannotated data and measuring a dispersion of quality metrics across runs.

47. The system of claim 41, wherein the functions performed by the system further comprise:

monitoring for changes between the first machine learning model and the second machine learning model via data drift or concept drift.

48. The system of claim 41, wherein the functions performed by the system further comprise predicting the respective annotations for each of the plurality of samples of the set of unannotated data.

49. The system of claim 48, wherein the functions performed by the system further comprise storing the predicted respective annotations in a priority queue based on a sampling score.

50. The system of claim 49, wherein the functions performed by the system further comprise, prior to storing the predicted respective annotations in the priority queue, determining whether the sampling score is greater than a threshold sampling score.

51. The system of claim 50, wherein the functions performed by the system further comprise discarding a prediction having a sampling score that is determined to be less than the threshold sampling score.

52. The system of claim 49, wherein the priority queue stores a predetermined maximum number of predictions, and wherein the functions performed by the system further comprise determining that a number of predictions stored in the priority queue is less than the predetermined maximum number of predictions prior to storing the prediction in the priority queue.

53. The system of claim 50, wherein the functions performed by the system further comprise determining that the sampling score is greater than at least one previously stored prediction in the priority queue prior to storing the prediction in the priority queue.

54. The system of claim 49, wherein the functions performed by the system further comprise discarding a previously stored prediction in the priority queue having a lowest sampling score.

* * * * *